United States Patent
Miyazawa et al.

(10) Patent No.: US 8,368,947 B2
(45) Date of Patent: Feb. 5, 2013

(54) TECHNIQUE FOR CREATING PRINT DATA

(75) Inventors: Masafumi Miyazawa, Nagoya (JP); Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1139 days.

(21) Appl. No.: 12/183,514

(22) Filed: Jul. 31, 2008

(65) Prior Publication Data

US 2009/0034853 A1 Feb. 5, 2009

(30) Foreign Application Priority Data

Jul. 31, 2007 (JP) .................................. 2007-198862

(51) Int. Cl.
*G06F 3/12* (2006.01)
*G06K 15/00* (2006.01)
*H04N 1/60* (2006.01)

(52) U.S. Cl. .......... 358/1.18; 358/1.1; 358/1.9; 358/2.1; 358/1.15; 358/1.16; 358/1.17

(58) Field of Classification Search .................. None
See application file for complete search history.

(56) References Cited

U.S. PATENT DOCUMENTS

| | | | |
|---|---|---|---|
| 5,377,312 A * | 12/1994 | Kobayashi | 358/1.17 |
| 6,208,429 B1 * | 3/2001 | Anderson | 358/1.18 |
| 6,734,989 B2 | 5/2004 | Tsunekawa | |
| 7,880,917 B2 | 2/2011 | Yamamoto | |
| 2002/0176101 A1 | 11/2002 | Tsunekawa | |
| 2003/0161002 A1 | 8/2003 | Nishiwaki et al. | |
| 2004/0169880 A1 * | 9/2004 | Nakanishi et al. | 358/1.15 |
| 2005/0141032 A1 | 6/2005 | Yamamoto | |

FOREIGN PATENT DOCUMENTS

| | | |
|---|---|---|
| JP | 10-309835 | 11/1998 |
| JP | H11-170655 A | 6/1999 |
| JP | 2001-080138 A | 3/2001 |
| JP | 2001-119560 | 4/2001 |
| JP | 2002-059596 A | 2/2002 |
| JP | 2003-296054 A | 10/2003 |
| JP | 2004-227530 A | 8/2004 |
| JP | 2005-153267 A | 6/2005 |
| JP | 2007-30353 | 2/2007 |

OTHER PUBLICATIONS

European Search Report issued in European Patent Application No. EP 08252586.6-1248, dated Dec. 4, 2008.
JP Office Action mailed Mar. 13, 2012, JP Appln. 2007-198862, English translation.

* cited by examiner

*Primary Examiner* — King Poon
*Assistant Examiner* — Vincent Peren
(74) *Attorney, Agent, or Firm* — Banner & Witcoff, Ltd.

(57) ABSTRACT

A print data creation apparatus may include an obtaining device, a decompressed data creation device, a band determination device, a deletion device, a data range storage device, a data range specifying device, and a print data creation device. The obtaining device obtains compressed data of one or more image objects. The decompressed data creation device decompresses the compressed data in partial units. The band determination device determines for which band the decompressed data is necessary. The deletion device deletes the decompressed data for which the band has been determined. The data range storage device stores an association of the band and a data range of the compressed data necessary for creating print data corresponding to the band. The data range specifying device specifies a data range of compressed data associated with a band. The print data creation device creates print data from compressed data within the data range specified.

7 Claims, 21 Drawing Sheets

```
<?xml version="1.0" encoding="UTF-8"?>
<!DOCTYPE html PUBLIC "-//W3C//DTD XHTML-Print 1.0//EN"
    "http://www.w3.org/MarkUp/DTD/xhtml-print10.dtd">
<html xmlns="http://www.w3.org/1999/xhtml">
<head>
<title>index photo print</title>         302
<base href="http://192.168.0.100/photo/" />

<style type="text/css">
@media print {  @page {size:letter; margin:0.2in;}}
```

```
body { padding:0in; } div.page { position:relative; page-break-after:always; }
div.page_last { position:relative;}
```

320      322      324      326      328

315 {
```
div.img1 {overflow:hidden; padding:0in; position:absolute; top:0.0in; left:0.466in; width:3.25in; height:2.5in;}
div.img2 {overflow:hidden; padding:0in; position:absolute; top:0.0in; left:4.382in; width:3.25in; height:2.5in;}
div.img3 {overflow:hidden; padding:0in; position:absolute; top:2.7in; left:0.466in; width:3.25in; height:2.5in;}
div.img4 {overflow:hidden; padding:0in; position:absolute; top:2.7in; left:4.382in; width:3.25in; height:2.5in;}
div.img5 {overflow:hidden; padding:0in; position:absolute; top:5.4in; left:0.466in; width:3.25in; height:2.5in;}
div.img6 {overflow:hidden; padding:0in; position:absolute; top:5.4in; left:4.382in; width:3.25in; height:2.5in;}
div.img7 {overflow:hidden; padding:0in; position:absolute; top:8.1in; left:0.466in; width:3.25in; height:2.5in;}
div.img8 {overflow:hidden; padding:0in; position:absolute; top:8.1in; left:4.382in; width:3.25in; height:2.5in;}
```
315a

```
/* 2.5 x 3.25 in */
```

340 {
```
img.img_23_0deg    { width:3.75in;  height:2.5in; margin-left: -0.25in;  image-orientation:0deg;   }
img.img_23_90deg   { width:3.75in;  height:2.5in; margin-left: -0.25in;  image-orientation:90deg;  }
img.img_23_180deg  { width:3.75in;  height:2.5in; margin-left: -0.25in;  image-orientation:180deg; }
img.img_23_270deg  { width:3.75in;  height:2.5in; margin-left: -0.25in;  image-orientation:270deg; } img.img_34_0deg    { width:3.333in; height:2.5in; margin-left: -0.042in; image-orientation:0deg;   }
img.img_34_90deg   { width:3.333in; height:2.5in; margin-left: -0.042in; image-orientation:90deg;  }
img.img_34_180deg  { width:3.333in; height:2.5in; margin-left: -0.042in; image-orientation:180deg; }
img.img_34_270deg  { width:3.333in; height:2.5in; margin-left: -0.042in; image-orientation:270deg; } img.img_916_0deg   { width:4.444in; height:2.5in; margin-left: -0.597in; image-orientation:0deg;   }
img.img_916_90deg  { width:4.444in; height:2.5in; margin-left: -0.597in; image-orientation:90deg;  }
img.img_916_180deg { width:4.444in; height:2.5in; margin-left: -0.597in; image-orientation:180deg; }
img.img_916_270deg { width:4.444in; height:2.5in; margin-left: -0.597in; image-orientation:270deg; }
```
340a

```
<div class="page">
  <div class="img1"><img src="photo001.jpg" class="img_34_0deg" alt="photo"/></div>
  <div class="img2"><img src="photo002.jpg" class="img_34_0deg" alt="photo"/></div>
  <div class="img3"><img src="photo003.jpg" class="img_34_0deg" alt="photo"/></div>
  <div class="img4"><img src="photo004.jpg" class="img_34_0deg" alt="photo"/></div>
  <div class="img5"><img src="photo005.jpg" class="img_34_0deg" alt="photo"/></div>
  <div class="img6"><img src="photo006.jpg" class="img_34_0deg" alt="photo"/></div>
  <div class="img7"><img src="photo007.jpg" class="img_34_0deg" alt="photo"/></div>
  <div class="img8"><img src="photo008.jpg" class="img_34_0deg" alt="photo"/></div>
```

300
350a
350
352
354

JPEG File 610

612
614

700

701

GET /photo/photo001.jpg HTTP/1.1
Host: 192.168.0.100
Accept: text/xml,application/xml,application/xhtml+xml,text/html;q=0.9,text/plain;q=0.8,image/png,*/*;q=0.5
Accept-Language: ja,en-us;q=0.7,en;q=0.3
Accept-Encoding: gzip,deflate
Accept-Charset: Shift_JIS,utf-8;q=0.7,*;q=0.7
Range:bytes=4000-7999 ← 702
Keep-Alive: 300

710

HTTP/1.x 200 OK
Date: Thu, 15 Mar 2007 12:07:03 GMT
Content-Range: bytes 4000-7999/1678092 ← 714
Content-Type: image/jpeg ← 712
Last-Modified: Tue, 06 Jun 2006 23:51:10 GMT Compressed Data —716

FIG. 17

```
body { padding:0in; } div.page { position:relative; page-break-after:always; }
div.page_last { position:relative; }     820

815 → div.img1 {overflow:hidden; padding:0in; position:absolute; top:0.0in; left:0.466in; width:15.0in; height:10.0in;}
                                                              822          824          826         828

/* 2.5 x 3.25 in */
img.img_23_0deg    { width:3.75in;  height:2.5in;  margin-left: -0.25in;  image-orientation:0deg; }
img.img_23_90deg   { width:3.75in;  height:2.5in;  margin-left: -0.25in;  image-orientation:90deg; }
img.img_23_180deg  { width:3.75in;  height:2.5in;  margin-left: -0.25in;  image-orientation:180deg; }
img.img_23_270deg  { width:3.75in;  height:2.5in;  margin-left: -0.25in;  image-orientation:270deg; } img.img_34_0deg    { width:3.333in; height:2.5in;  margin-left: -0.042in; image-orientation:0deg; }
img.img_34_90deg   { width:3.333in; height:2.5in;  margin-left: -0.042in; image-orientation:90deg; }
img.img_34_180deg  { width:3.333in; height:2.5in;  margin-left: -0.042in; image-orientation:180deg; }
img.img_34_270deg  { width:3.333in; height:2.5in;  margin-left: -0.042in; image-orientation:270deg; }      840a img.img_916_0deg   { width:4.444in; height:2.5in;  margin-left: -0.597in; image-orientation:0deg; }
img.img_916_90deg  { width:4.444in; height:2.5in;  margin-left: -0.597in; image-orientation:90deg; }
img.img_916_180deg { width:4.444in; height:2.5in;  margin-left: -0.597in; image-orientation:180deg; }
img.img_916_270deg { width:4.444in; height:2.5in;  margin-left: -0.597in; image-orientation:270deg; }
                                                                                           840
                                                              852                854
<div class="page">
850 → <div class="img1"><img src="photo001.jpg" class="img_34_270deg" alt="photo" /></div>
```

| Block | Coordinate | Width | Band | Data Range |
|-------|------------|-------|------|------------|
| B1 | C1 | D1 | 5 | R1 ~ R2 |
| B2 | C2 | D2 | 4 | R3 ~ R4 |
| B3 | C3 | D3 | 3 | R5 ~ R6 |
| B4 | C4 | D4 | 2 | R7 ~ R8 |
| B5 | C5 | D5 | 1 | R9 ~ R10 |
| B6 | C6 | D1 | 5 | R11 ~ R12 |
| | | | | |

TECHNIQUE FOR CREATING PRINT DATA

CROSS-REFERENCE TO RELATED APPLICATIONS

This application claims priority to Japanese Patent Application No. 2007-198862, filed on Jul. 31, 2007, the contents of which are hereby incorporated by reference into the present application.

BACKGROUND OF THE INVENTION

1. Field of the Invention

The present invention relates to a technique for obtaining compressed data of image objects, creating decompressed data by decompressing the compressed data, and creating print data by converting the decompressed data. More particularly, the present invention relates to a technique for creating print data in band units.

2. Description of the Related Art

Japanese Patent Application Publication No. 2001-119560 discloses a printer which creates print data in band units. The printer has a memory with a capacity to store an image portion (band) which corresponds to a single scanning of a print head. The printer decompresses raster image data in the aforementioned memory at a time serially. This printer can perform print as long as a memory area with a capacity based on the number of nozzles of the print head and a band width is available. Further, the document discloses a process of rotating image objects and printing such image objects.

BRIEF SUMMARY OF THE INVENTION

This specification discloses a technique to create print data efficiently from compressed data of an image object.

One technique disclosed in this specification is a print data creation apparatus that creates print data in band units. The print data creation apparatus is provided with an obtaining device, a decompressed data creation device, a band determination device, a deletion device, a data range storage device, a data range specifying device, and a print data creation device. The obtaining device obtains compressed data of one or more image objects. The decompressed data creation device creates decompressed data by decompressing the compressed data of the aforementioned one or more image objects in partial units. It should be noted that the decompressed data creation device may start partially decompressing the compressed data after all the compressed data of the image object(s) are obtained by the obtaining device. Further, as described later, the obtaining device may obtain the compressed data in small fractions. In this case, the decompressed data creation device may create the decompressed data every time the compressed data is obtained by the obtaining device.

The band determination device determines, for each decompressed data created by the decompressed data creation device, to which band the decompressed data is necessary. The deletion device deletes decompressed data corresponding to a band that has been determined by the band determination device. As described above, the band determination device determines, based on the decompressed data created from the compressed data, for which band's print data creation the decompressed data is necessary. Thus, an association of the band and a data range of compressed data that is necessary for creating print data corresponding to the band is specified. The data range storage device stores this association. More specifically, the data range storage device stores, based on information determined by the band determination device, for each band, an association of the band and a data range of the compressed data that is necessary for creating print data corresponding to the band. The data range specifying device specifies, based on information stored in the data range storage device, a data range of compressed data associated with a band of which print data is to be created. The print data creation device creates print data from compressed data within the data range specified by the data range specifying device. Thus, print data for a single band is completed.

The technique described above derives the association of a band and a data range of compressed data which is necessary for creating print data of the band. As long as the association as such is specified, compressed data necessary for creating respective band at the time of creating print data of each band is specified. For example, for creating print data of a single band, the compressed data necessary for creating the band can be selectively decompressed. It is not required to decompress all the compressed data (or almost all the compressed data) for each time print data of a band is created. Though this technique requires processing time to establish the association of a band and a data range of compressed data, however, once the association is established, only a short processing time is required for creating print data of each band. Furthermore, in the technique described above, the association of a band and a data range of compressed data is established by repeating decompression of the compressed data, determination of the band, and deletion of decompressed data. Since the above described technique does not utilize a method of caching all the decompressed data which is created from the compressed data, memory usage can be controlled. Advantageous print data creation is facilitated by the employment of the present technique.

It should be noted that if a single image object exists, the decompressed data creation device may repeat decompressing the compressed data of the image object in partial units. Further, if two image objects exist, for example, the decompressed data creation device may decompress all the compressed data of one image object and then decompress all the compressed data of the other image object. This case may also be described by the expression "the decompressed data creation device decompresses the compressed data in partial units".

BRIEF DESCRIPTION OF THE DRAWINGS

FIG. 8 illustrates an example of XHTML print data.

FIG. 9 illustrates an example of the XHTML print data.

FIG. 10 illustrates an example of the XHTML print data.

FIG. 17 illustrates another example of the XHTML print data.

FIG. 23 illustrates an example of a table.

DETAILED DESCRIPTION OF THE PREFERRED EMBODIMENT

Figure 1:
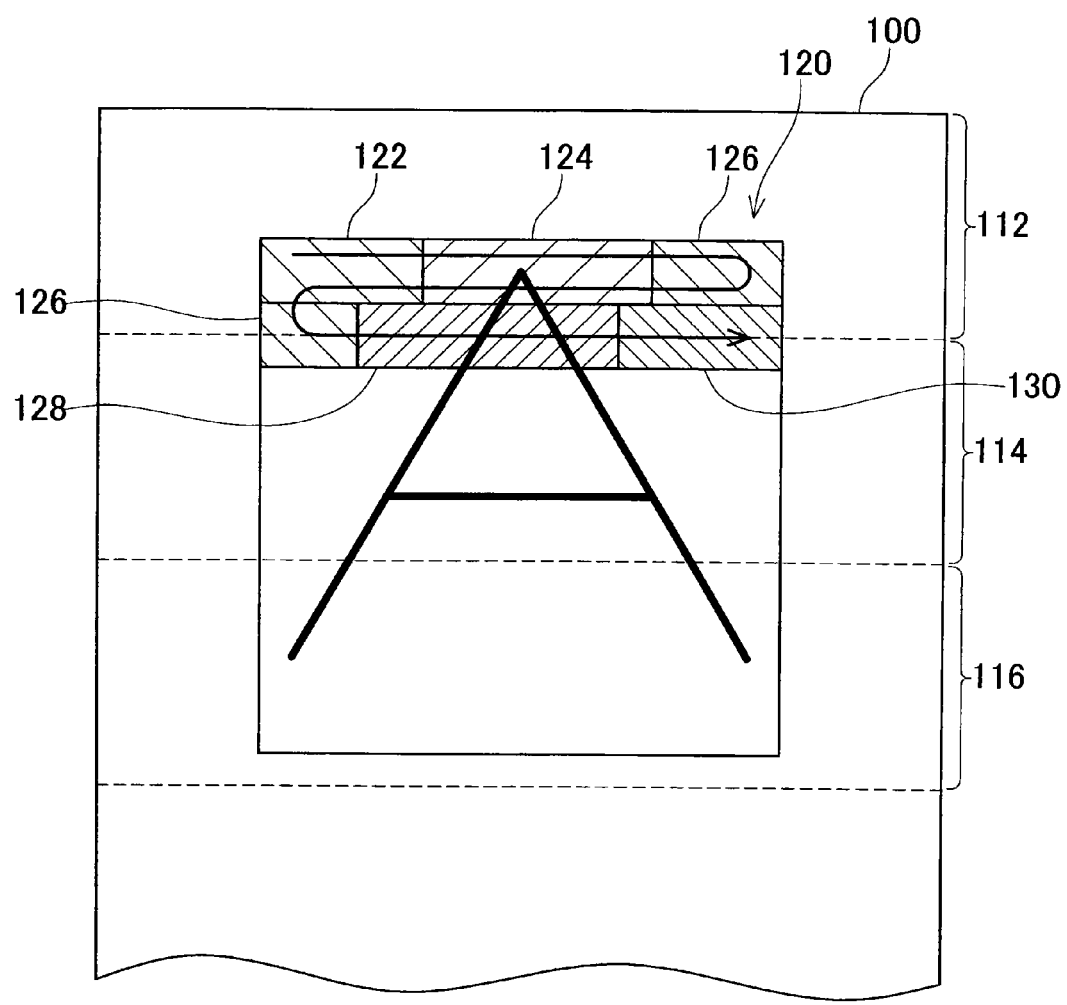
FIG. 1 is a diagram for explaining a state of creating print data in band units.

FIG. 1 illustrates a state in which print data utilized in printing onto a print medium 100 is divided into a plurality of bands 112, 114, and 116. In the example, an image object 120 having the English alphabet "A" is to be printed on the print medium 100. In order to print the image object 120 on a print medium 100, print data of the bands 112, 114, and 116 are created respectively in sequence. More specifically, print data of the band 112 is created and printed firstly, print data of the band 114 is created and printed secondly, and print data of the band 116 is created and printed thirdly. For example, in a case of creating the print data of the band 112, a process carried out in accordance with the following procedure may be suggested. Firstly, decompressed data is created by decompressing compressed data 122 of the image object 120, and print data is created by converting the decompressed data. Secondly, print data is created from compressed data 124. Thirdly, print data are created from compressed data 126, 128, and 130 in the sequential order. The print data of the band 112 is thus completed from the series of the aforementioned processes, and the print data is printed on the print medium 100 in accordance with the print data. The print data of the band 112 can be deleted after printing. Then, by decompressing compressed data subsequent to the compressed data 130, print data of the band 114 can be created. The method, in which creation and printing of print data in band units is repeated as described above, allows deleting print data of the band from which the printing has been completed. Therefore, the memory usage can be controlled to be small.

In the above example, compressed data of the image object 120 is partially and repeatedly decompressed. More specifically, the compressed data 122 is first decompressed, and then the compressed data 124, 126, 128, and 130 are decompressed in that sequence. It may seem that, instead of the above method, all the compressed data (the compressed data 124, 126, 128, and 130 and the compressed data subsequent to the compressed data 130) of the image object 120 should be decompressed simultaneously. However, such a method requires caching all the decompressed data created from the compressed data, and thereby imposes a heavy burden on memory. On the other hand, the method described above, in which creation and printing of print data in band units is repeated in smaller fractions, decompressed data that has been converted into print data can be deleted advantageously in sequence and thereby the memory usage can be controlled to save memory.

Figure 2:
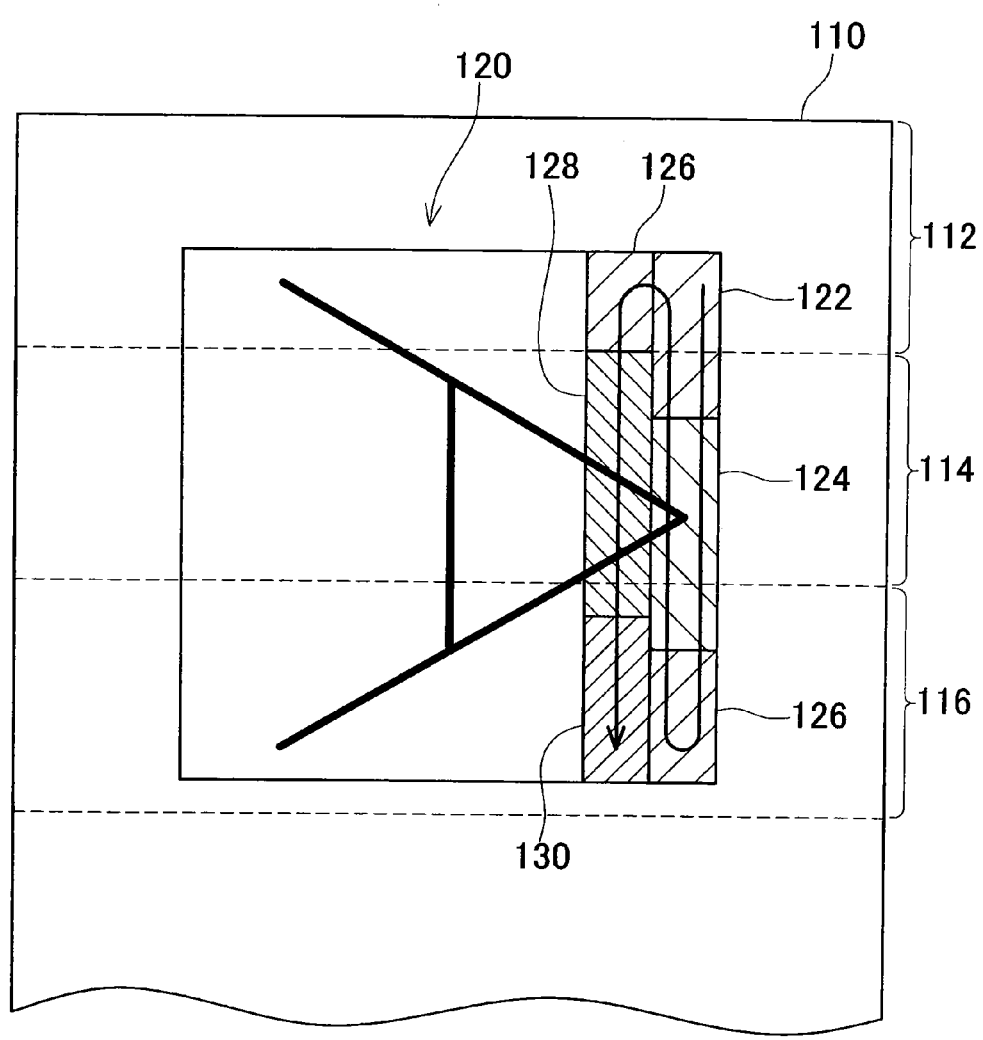
FIG. 2 is a diagram illustrating an image object having rotated 90 degrees in a clockwise direction from the state shown in FIG. 1.

There may be a case where image objects are rotated for printing as described above. For example, FIG. 2 illustrates the image object 120 of FIG. 1, which is rotated by 90 degrees in a clockwise direction. Also in this example, by repeating partial decompression of compressed data of the image object 120, print data of the bands 112 to 116 can be created. For example, in order to create print data of the band 112 in this case, in addition to the compressed data 122 to 130, compressed data subsequent to the compressed data 130 need to be decompressed. Without decompressing almost all the compressed data, print data of the band 112 cannot be created. In the above described example of FIG. 1, print data of the band 114 can be created by decompressing in sequence the compressed data subsequent to the compressed data 122 to 130 required for creating the band 112. However, in the example of FIG. 2, it is impossible in the course of creating print data of the band 114, to decompress only the compressed data that are subsequent to the compressed data which were required for creating the band 112. In order to create print data of the band 114, all the compressed data (or almost all the compressed data) have to be decompressed again. Similarly, creating print data of the band 116 requires decompressing all (or almost all) the compressed data. This prolongs processing time required for creating print data. Indeed, caching all the decompressed data on creating print data of the first band 112 may avoid overlappingly decompressing the compressed data on creating print data of the band 114 and the band 116. However, this method significantly burdens memory as described above.

For creating data, it appears simple to selectively decompress the compressed data corresponding to a band from which print data is created. For example, it appears that, a data range of the compressed data required for creating print data of the band 112 can be specified from among all the compressed data of the image object 120, and then print data of the band 112 can be created. However, the information regarding which band's print data creation corresponds to the compressed data remains missing, until the compressed data has been decompressed. In other words, the compressed data is not informative of an association of a band and a data range of the compressed data required for creating print data of the band. The method disclosed herein solves the above problem and facilitates efficient creation of print data.

Embodiment

Figure 3:
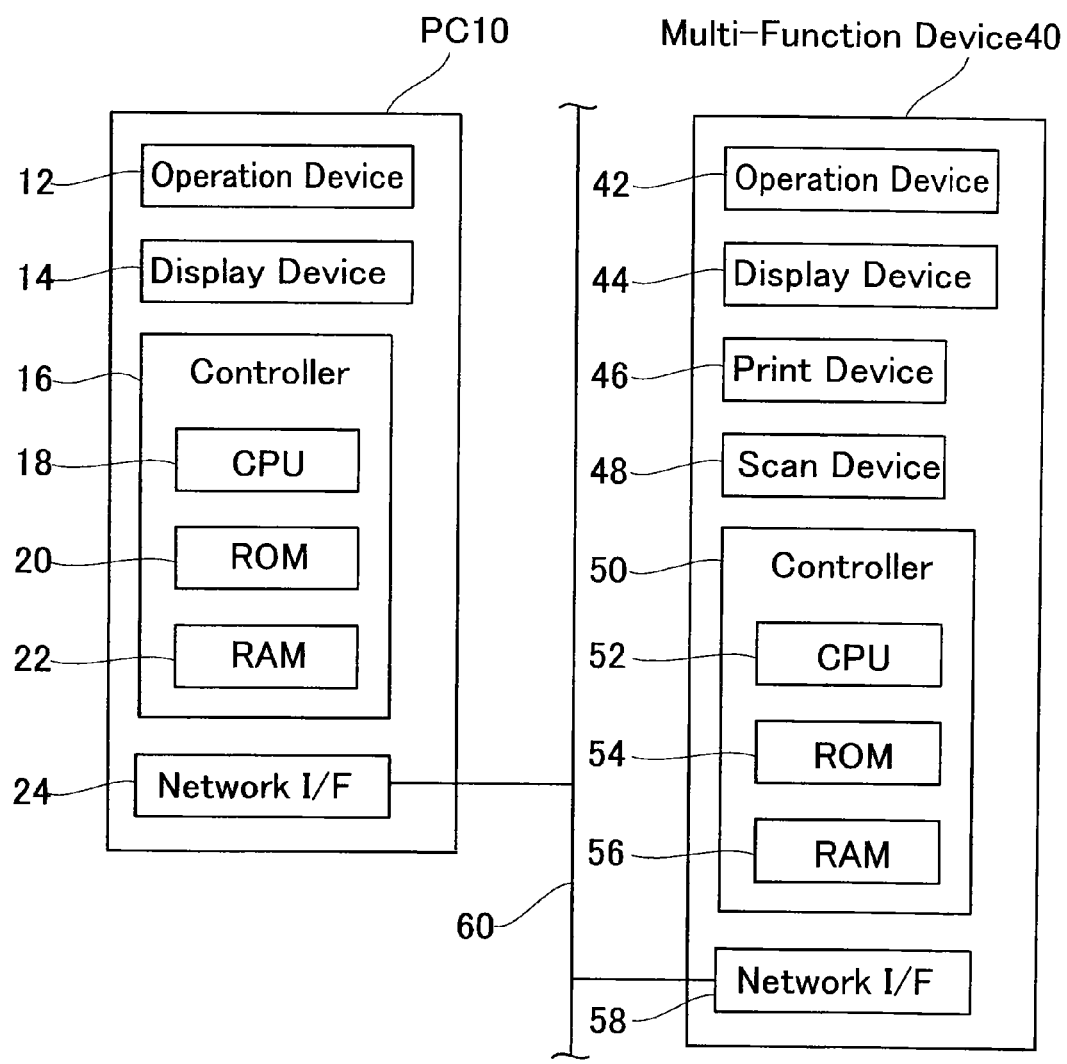
FIG. 3 illustrates the composition of a multi-function device system according to an embodiment.

An embodiment will be described with reference to accompanying drawings. FIG. 3 illustrates a multi-function device system 2 according to this embodiment. The multi-function device system 2 is provided with a PC 10 and a multi-function device 40.

(Composition of PC)

PC 10 is provided with an operation device 12, a display device 14, a controller 16, and a network interface (which is abbreviated as I/F) 24. The operation device 12 is composed of a keyboard and a mouse. A user can input various information and commands into the PC 10 by operating the operation device 12. For example, a user can input printing commands into the PC 10. As its result, XHTML print data which will be described later in detail is then transmitted from the PC 10 to the multi-function device 40. The display device 14 can display various information.

The controller 16 has a CPU 18, a ROM 20, a RAM 22, and the like. The CPU 18 carries out various processes in accordance with programs stored in the ROM 20. The ROM 20 stores various programs. For example, the ROM 20 stores a program for carrying out processes of creating and transmitting the XHTML print data which will be further described later to the multi-function device 40. The RAM 22 can temporarily store various information to be created in the course of the CPU 18 carrying out process. The network I/F 24 is connected to a network line 60. The network line 60 is connected to the multi-function device 40. The PC 10 is capable of establishing communication with the multi-function device 40 via the network I/F 24.

(Composition of Multi-Function Device)

The multi-function device 40 has an operation device 42, a display device 44, a print device 46, a scan device 48, a controller 50, and a network interface (which is abbreviated as I/F) 58. The operation device 42 is composed of a plurality of keys. A user can input various information and commands into the multi-function device 40 by operating the operation device 42. The display device 44 can display various information. The print device 46 according to this embodiment is inkjet type. The print device 46 can print on a printing paper based on binary data (print data) which will be described later in detail. The scan device 48 can generate image data by scanning a manuscript copy.

The controller 50 has a CPU 52, a ROM 54, a RAM 56, and the like. The CPU 52 carries out various processes in accordance with programs stored in the ROM 54. The ROM 54 stores various programs. For example, the ROM 54 stores programs for carrying out a process of determining a layout of binary data based on the XHTML print data, a process of downloading compressed data of image objects, a process of creating decompressed data by decompressing the compressed data, a process of converting the decompressed data into binary data, and the like. The RAM 56 can temporally store various information to be generated in the course of the CPU 56 carrying out processes. Contents of the information to be stored in the RAM 56 will be described later. The network I/F 58 is connected to the network line 60. The network line 60 is connected to the PC 10. The multi-function device 40 is capable of establishing communication with the PC 10 via the network I/F 58.

(Contents of Data Stored in Multi-Function Device)

Figure 4:
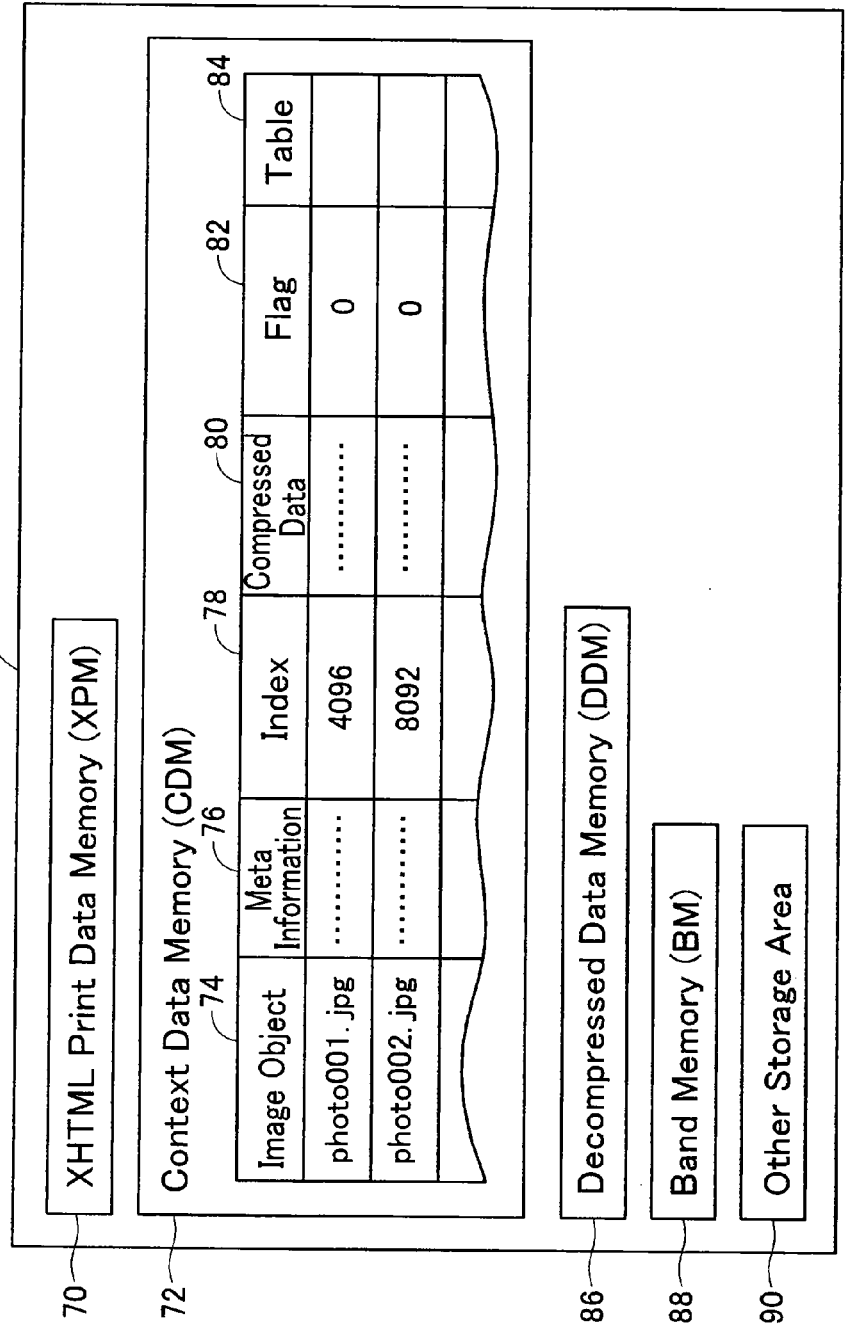
FIG. 4 illustrates an example of contents stored in a RAM of the multi-function device.

FIG. 4 illustrates an example of contents stored in the RAM 56 of the multi-function device 40. The RAM 56 has an XHTML print data memory (XPM) 70, a context data memory (CDM) 72, a decompressed data memory (DDM) 86, a band memory (BM) 88, another storage area 90, and the like. The XPM 70 can store the XHTML print data transmitted from the PC 10. Contents of the XHTML print data will be described later in detail. The CDM 72 can store, in association, an address (file name) of image object 74, meta information 76, an index 78, compressed data 80, a received flag 82, and a table 84. Specific contents of the respective data 74 to 84 will be described later in detail. The DDM 86 can store decompressed data. The BM 88 can store binary data (print data) for a single band. The storage area 90 can store various data. Contents of data stored in the storage area 90 will be described later on demand.

(Processes to be Performed by PC)

As described above, a user can input a printing command by operating the operation device 12 of the PC 10. In this case, the PC 10 creates the XHTML print data (whose details will be described later) from data to be printed. The PC 10 transmits the XHTML print data to the multi-function device 40. The multi-function device 40 then carries out the following processes.

(Processes Performed by Multi-Function Device)

Figure 5:
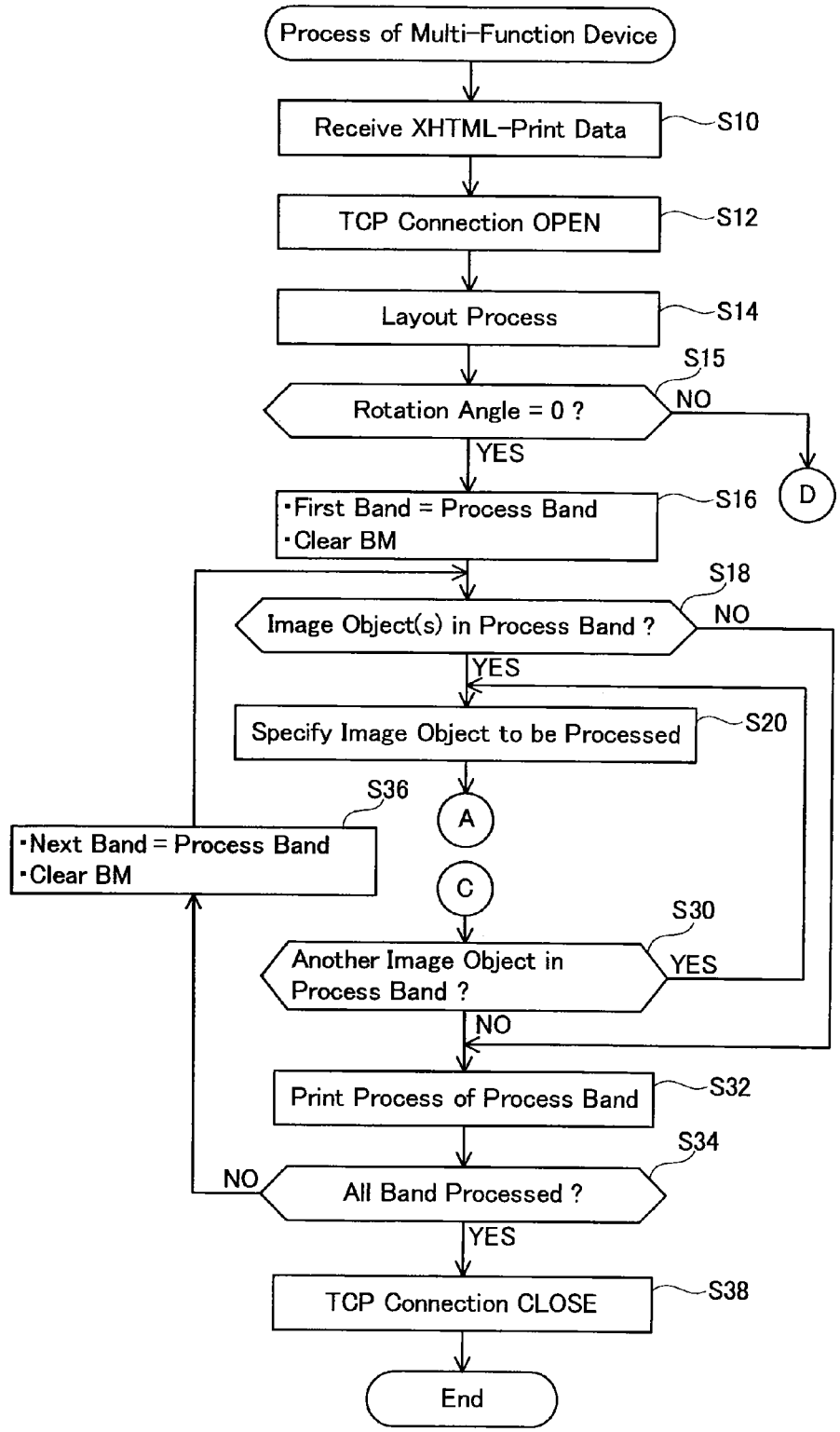
FIG. 5 illustrates a flowchart of the process to be carried out by the multi-function device.
Figure 6:
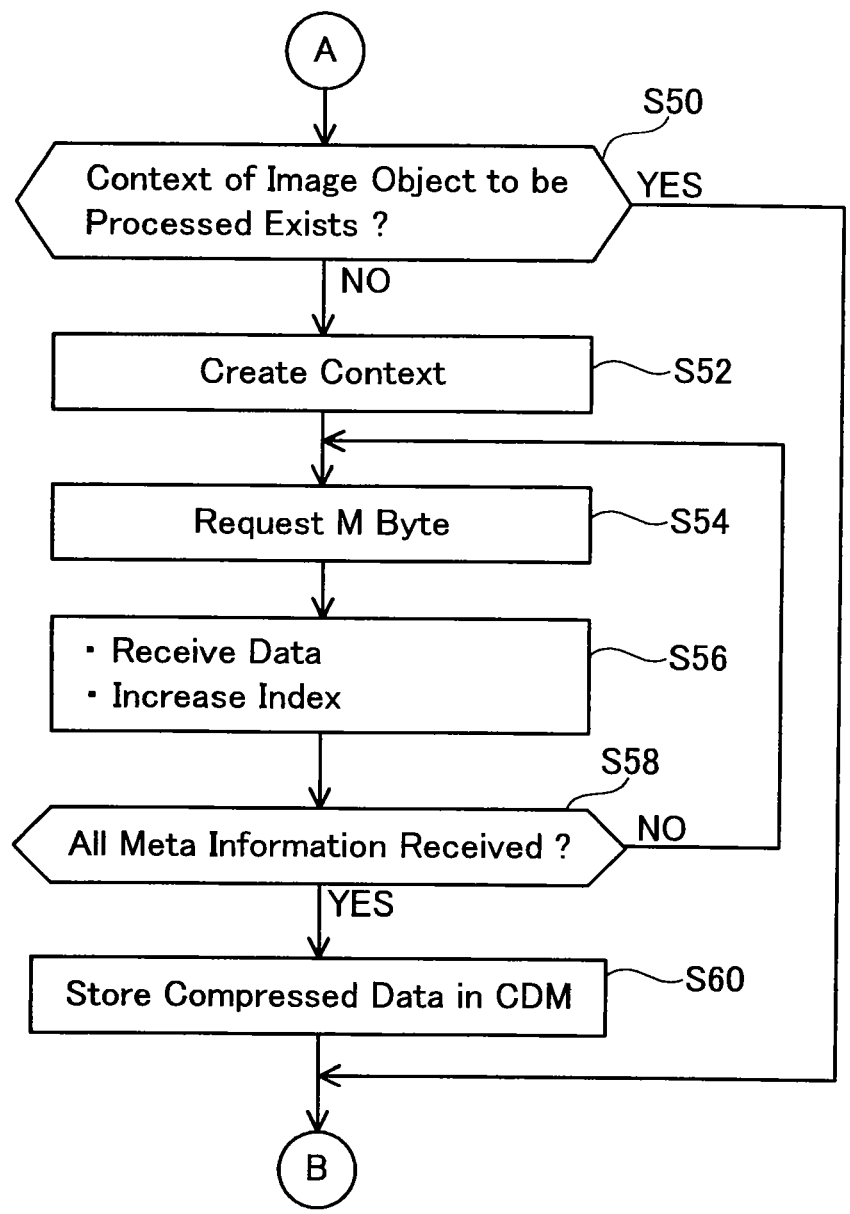
FIG. 6 illustrates a flowchart which forms a sequel to that of FIG. 5.
Figure 7:
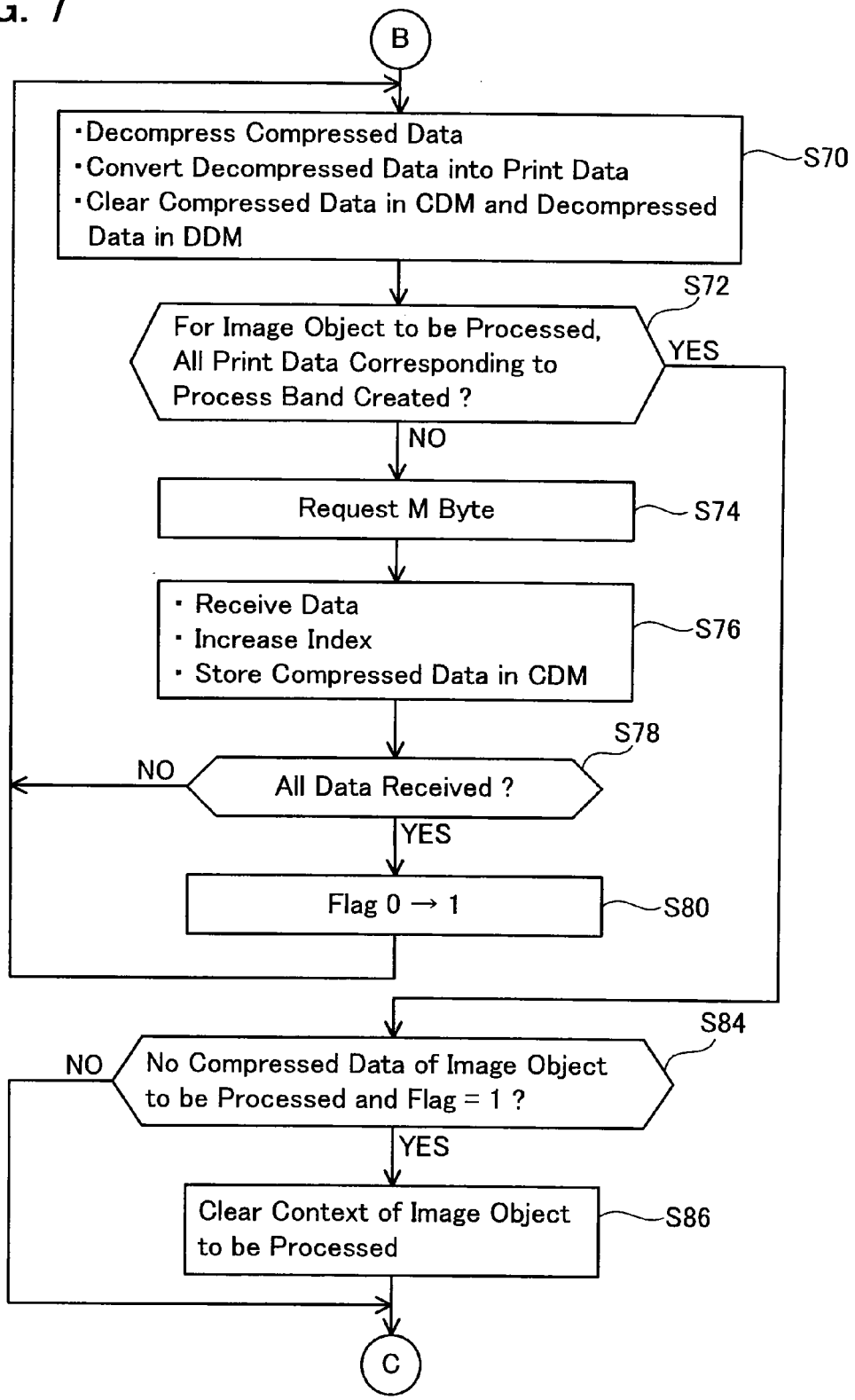
FIG. 7 illustrates a flowchart which forms a sequel to that of FIG. 6.

Now processes performed by the multi-function device 40 are described. The processes are carried out by the CPU 52 of the multi-function device 40. FIGS. 5 to 7 illustrate flowcharts of the processes performed by the multi-function device 40 when the XHTML print data is transmitted from the PC 10.

When the XHTML print data is received (S10), the CPU 52 stores the XHTML print data in the XPM 70 (see FIG. 4). Secondly, the CPU 52 establishes a TCP connection to the PC 10 (S12). Then, the CPU 52 carries out a layout process based on the XHTML print data stored in the XPM 70 (S14).

Now detailed contents of the layout process are described. FIGS. 8 to 10 exemplify a part of the XHTML print data. As shown in FIG. 8, XHTML print data 300 includes a reference URI 302. The reference URI 302 includes an IP address of the PC 10 "192.168.0.100" and "photo." The multi-function device 40 downloads compressed data of the image object (image file; which is explained later in detail) included in the reference URI 302, creates decompressed data by decompressing the compressed data, and converts the decompressed data into binary data (print data). The XHTML print data 300 includes a letter string 304 for specifying a rule of printing media, a letter string 306 for specifying a printable range, a size of printing medium 307, and a blank 308. A detailed description concerning how the blank 308 is used will be given later.

As shown in FIG. 9, the XHTML print data 300 includes a blank 310 (which is described later in detail). Further, the XHTML print data 300 includes data 315 for specifying a position of the image object. The XHTML print data 300 includes eight pieces of image objects to be printed within a single page. More specifically, in the printing based on the XHTML print data 300, index printing of the eight pieces of image objects on a single printing medium is carried out. Accordingly, the data 315 includes respective position data of the eight pieces of image objects. The position data of each image object includes blanks 320, 322, and 324, width 326, and height 328 (which is described later in detail). Further, the XHTML print data 300 includes a class attribute 340 for specifying detailed positions of the image objects. The class attribute 340 specifies a rotation angle, a more detailed blank, or the like for each of the image objects.

As shown in FIG. 10, the XHTML print data 300 includes data 350 for specifying a file name 352 and a class 354 of each image object. For example, data 350a includes the file name 352 representing "photo 001.jpg" and the class 354 representing "img__34__0deg." The class 354 corresponds to a class attribute of a code 340a of FIG. 9. More specifically, an image object corresponding to the data 350a has the file name 352 representing "photo 001.jpg" and a rotation angle and a detailed blank are determined in accordance with the class attribute 340a. In this example, a class attribute of the code 340a includes "image-orientation:0deg." This suggests that the rotation angle of the image object corresponding to the data 350a is "zero". It should be noted that a description of a detailed blank included in the class attribute 340a is omitted.

Figure 11:
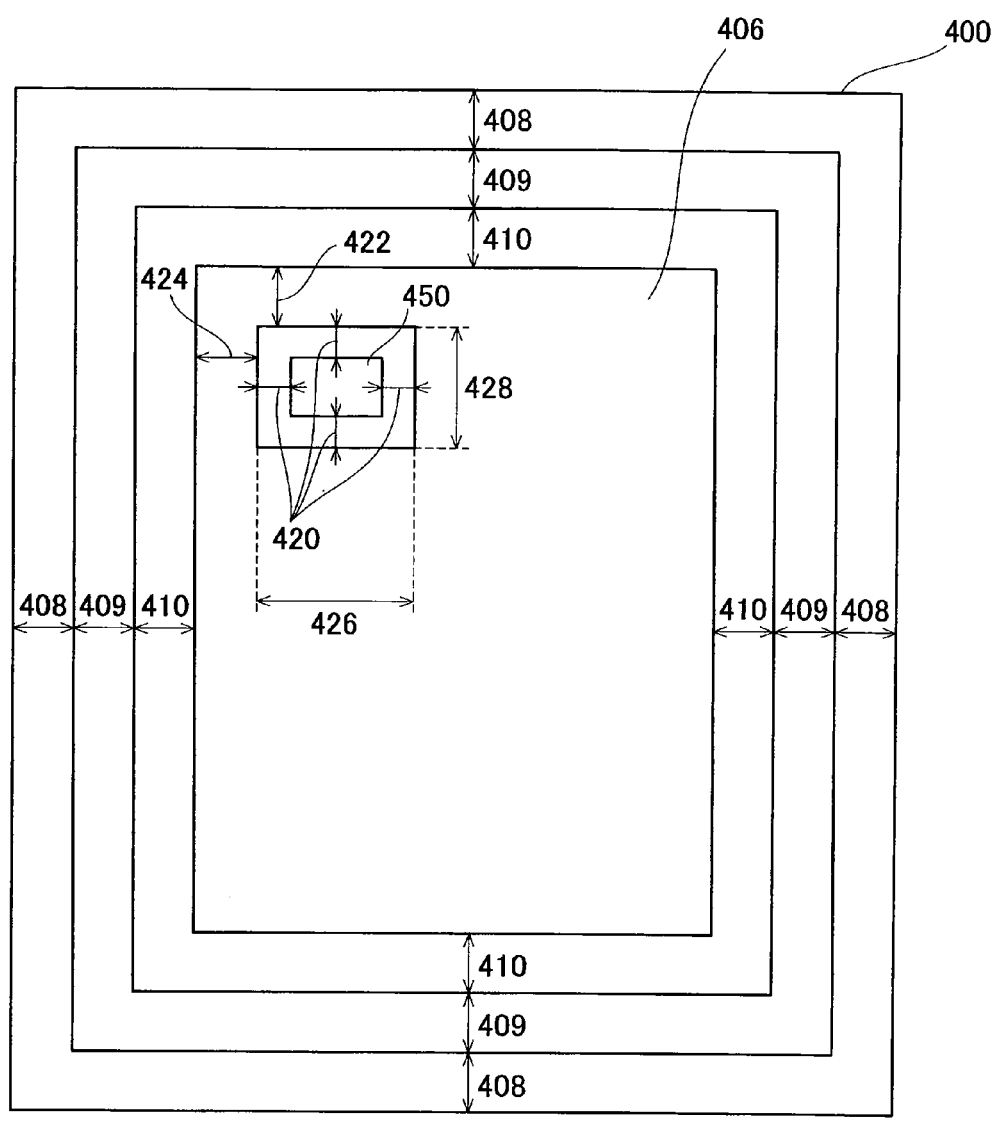
FIG. 11 is a diagram for explaining blanks or the like which is included in the XHTML print data.

FIG. 11 is an explanatory diagram illustrating the meaning of each blank or the like which is included in the XHTML print data 300. A reference numeral 400 represents a printing medium (for example, printing paper) of a single page. A size of the printing medium 400 is determined based on the size 307 of FIG. 8. In this example, a printing medium 400 is of a letter size. A blank 408 corresponds to the blank 308 of FIG. 8. Thus, in this example, the blank 408 is "0.2" (inch). A blank 409 is a value which is previously determined by the multi-function device 40. A blank 410 corresponds to the blank 310 of FIG. 9. Thus, in this example, the blank 410 is "zero". A page area 406 is thus defined, and a plurality of image objects is arranged within the page area 406.

A blank 422 of the page area 406 corresponds to the blank 322 of FIG. 9. For example, according to position data 315a of FIG. 9, the blank 322 is "zero". Hence, the blank 422 is accordingly "zero". A blank 424 of the page area 406 corresponds to the blank 324 of FIG. 9. For example, according to the position data 315a in FIG. 9 the blank 324 is "0.466" (inch). Hence, the blank 424 is accordingly "0.466" (inch). A blank 420 of the page area 406 corresponds to the blank 320 of FIG. 9. For example, according to the position data 315a in FIG. 9, the blank 320 is "zero". Hence, the blank 420 is accordingly "zero". A width 426 corresponds to the width 326 of FIG. 9. For example, according to the position data 315a of FIG. 9, the width 326 is "3.25" (inches). Hence, the width 426 is accordingly "3.25" (inches). A height 428 corresponds to the height 328 of FIG. 9. For example, according to the position data 315a of FIG. 9, the height 328 is "2.5" (inches). Hence, the height 428 is accordingly "2.5" (inches).

Figure 12:
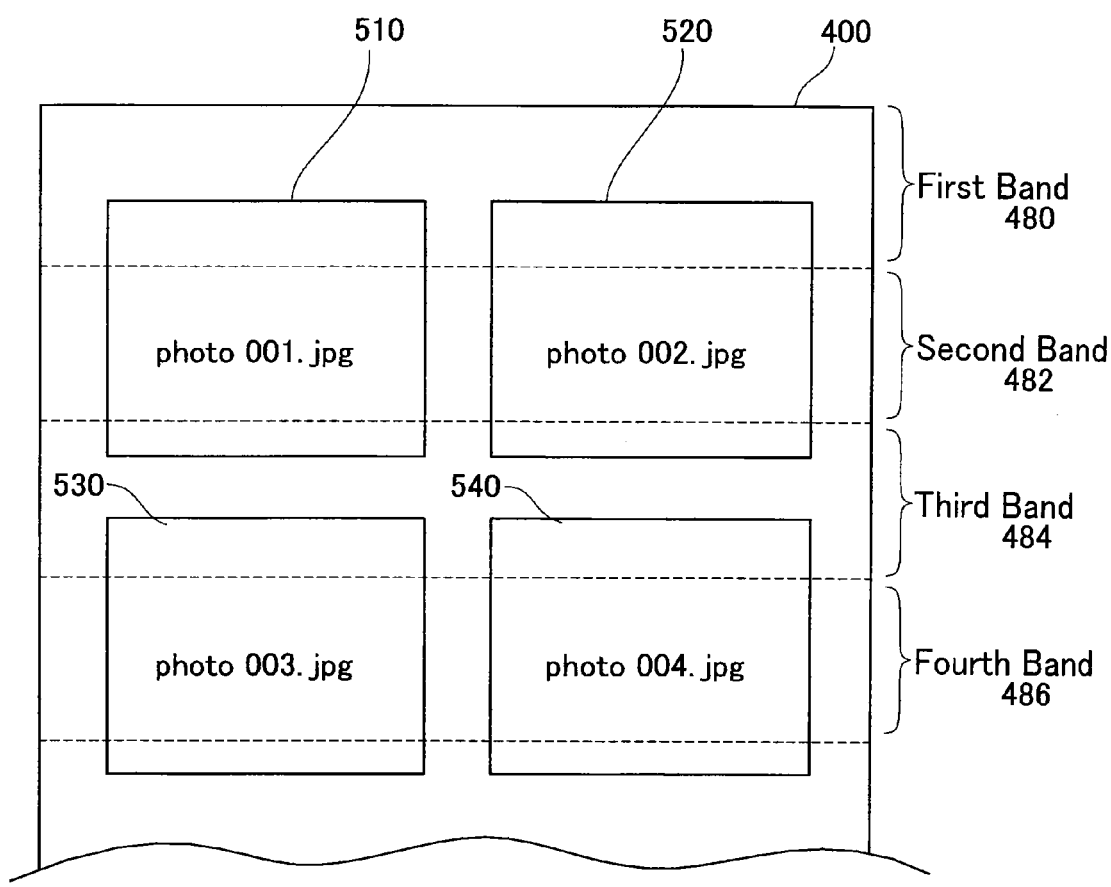
FIG. 12 illustrates a state in which a plurality of image objects is laid out on one page of a print medium.

A position of an image object can be determined by referring to each blank or the like included in the XHTML print data 300. More specifically, according to the example shown in FIG. 11, a single image object is arranged in an area indicated by a reference numeral 450. As described above, the XHTML print data 300 includes each position data 315 (see FIG. 9) of the eight pieces of image objects. The positions of the eight pieces of image objects within the printing medium 400 of FIG. 11 thus can be determined. In the layout process at S14 of FIG. 5, the CPU 52 determines the positions of the eight pieces of image objects based on the XHTML print data 300. FIG. 12 illustrates positions of image objects 510, 520, 530, and 540 within the printing medium 400. It should be noted that though eight pieces of image objects are actually laid out, FIG. 12 only illustrates the upper half of the printing medium 400. That is, FIG. 12 only illustrates four pieces of image objects 510, 520, 530, and 540.

The CPU 52 creates binary data in band units and then prints out. More specifically, the binary data used for the printing medium 400 of single page is divided into a plurality of bands 480, 482, 484, 486 etc. As described later, the CPU 52 first creates binary data of the first band 480 and performs print in accordance with the created binary data. Then, the CPU 52 creates binary data of the second band 482 and performs print. By repeating such processes on and after the third band 484, all the binary data corresponding to the printing medium 400 of single page are printed. It should be noted that the width of a single band (longitudinal length in FIG. 12) is the width which is printed by a single scan of an inkjet head. The band width may be determined in accordance with other standards.

Getting back to FIG. 5, further processes carried out by the CPU 52 is described. The layout data (data indicating the relative position of an image object and a band) created in the layout process at S14 is temporally stored, for example, in the storage area 90 (see FIG. 4). After the layout process, the CPU 52 specifies a rotation angle of the image object (S15). A rotation angle of each the image objects 510, 520, 530, 540 etc. can be specified based on the data 350 (see FIG. 10) of the XHTM print data 300. According to the example of FIG. 10, rotation angles of all the image objects 510, 520, 530, 540 etc. are zero. In this case, the CPU 52 makes an affirmative judgment ('YES' in S15) and advances to S16. On the other hand, if there is even a single image object whose rotation angle is not zero, the CPU 52 makes a negative judgment ('NO' in S15) and advances to S100 of FIG. 19.

Now processes carried out at S16 and its subsequent steps are described. Processes carried out at subsequent steps from S100 and on will be described later. At S16, the CPU 52 specifies the first band 480 as a process band, of which the subsequent processes are to be executed. Further, at S16, the CPU 52 clears the BM 88 (see FIG. 4). Next, the CPU 52 determines whether or not an image object is included in the process band (S18). For example, in the example of FIG. 12, the image objects 510 and 520 are included in the first band 480. Thus, in the case where the first band 480 is specified as the process band, the CPU 52 makes an affirmative judgment ('YES' in S18). If the judgment is affirmative at S18, the CPU 52 specifies an image object to be processed (S20). For example, the two image objects 510 and 520 exist as in the example of FIG. 12, one of the objects (image object 510 in this embodiment) is specified. Upon completion of S20, the CPU 52 advances to S50 of FIG. 6.

At S50, the CPU 52 determines whether or not context data of the image object to be processed exists. The CDM 72 shown in FIG. 4 can store context data for every image object. By checking the contents stored in the CDM 72, the CPU 52 determines whether or not context data of the image object to be processed has been already created. For example, in the case where the first band 480 of FIG. 12 is the process band, context data of the image object does not exist yet. In this case, a negative judgment is made ('NO' in S50).

If a negative judgment is made at S50, the CPU 52 creates context data of the image object 510 to be processed and stores the context data in the CDM 72 (S52). First, the CPU 52 stores a file name "photo 001.jpg" of the image object 510 in the CDM 72. At this time, nothing is stored in the meta information 76, the index 78, and the compressed data 80. Further, the received flag 82 is logic zero. It should be noted that if processes at S16 and the subsequent steps are carried out after an affirmative judgment is made at S15, the table 84 is not created. The table 84 is created in a case where processes at S100 and its subsequent steps are carried out after a negative judgment is made at S15. Detailed description of the table 84 will be given later.

Next, the CPU 52 transmits, to the PC 10, a request for transmitting predetermined bytes (4000 bytes in this embodiment) of response data (JPEG file in this embodiment) of the image object 510 to be processed (S54). More specifically, the CPU 52 transmits an HTTP request which includes the file name "photo 001.jpg" of the image object 510. The HTTP request includes a letter string which requesting transmission of 4000 bytes (range from 0 to 3999 bytes) of response data. The PC 10 as consequence transmits 4000 bytes of data included in the JPEG file of "photo 001.jpg" to the multi-function device 40 (HTTP response). It should be noted that the multi-function device 40 according to this embodiment carries out data communication with the PC 10 by means of single connection. In other words, the CPU 52 does not simultaneously transmit a plurality of HTTP requests. The CPU 52 transmits a single HTTP request, and on receiving an HTTP response to the request, the CPU 52 transmits the next HTTP request.

Figures 13, 14:
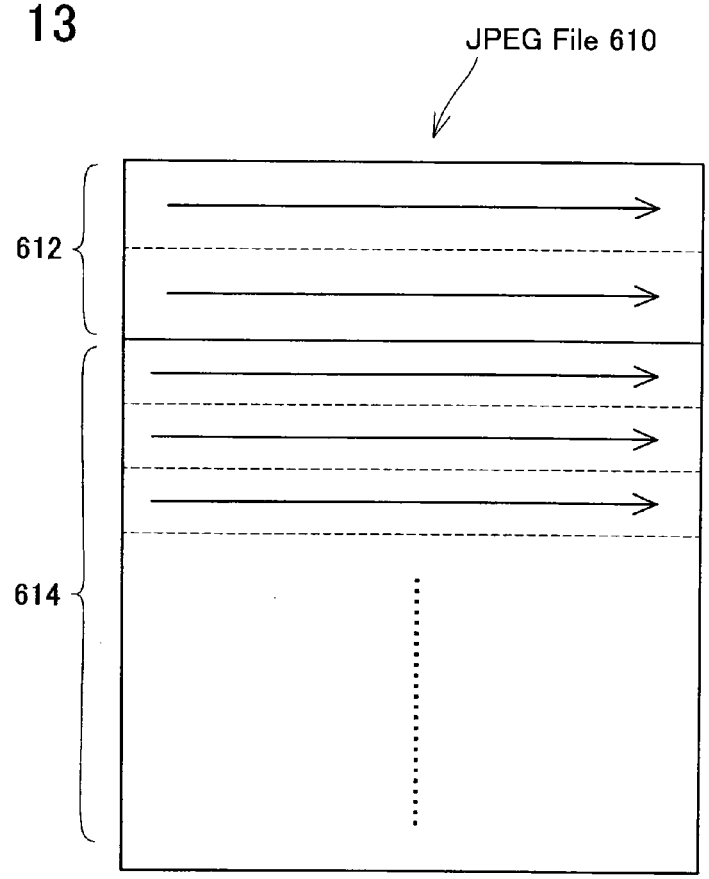
FIG. 13 briefly illustrates the data composition of a JPEG file.
FIG. 14 illustrates an example of an HTTP request.

Data composition of the JPEG file is described hereinafter. FIG. 13 briefly illustrates data composition of the JPEG file. A JPEG file 610 includes meta information 612 and compressed data 614. The meta information 612 includes parameters for images (resolution or the like) and parameters (Huffman table or the like) required for decompressing the compressed data 614. The compressed data 614 is the compressed form of the JPEG image data (decompressed data described later) of an image object. In the JPEG file 610, the meta information 612 exists at the head and is followed by the compressed data 614. Accordingly, when the multi-function device 40 requests the PC 10 to transmit data from its head, the PC 10 precedently transmits the meta information 612 in response.

For example, if a process of S54 of FIG. 6 is carried out on the image object 510 for the first time, the CPU 52 transmits an HTTP request which commands to transmit response data of a range from the head to 3999 bytes. FIG. 14 exemplifies an HTTP request 700. The HTTP request 700 includes a file name 701 of the image object 510. Further, the HTTP request 700 includes a letter string 702 which indicates a range of data. For example, when the CPU 52 commands to transmit a range of response data from the head to 3999 bytes, a value "0-3999" is inserted into the letter string 702 (in which value of "4000-7999" is indicated in FIG. 14). The PC 10 in response transmits, to the multi-function device 40, an HTTP response which includes data from the head to 3999 bytes range.

Figures 15, 16:
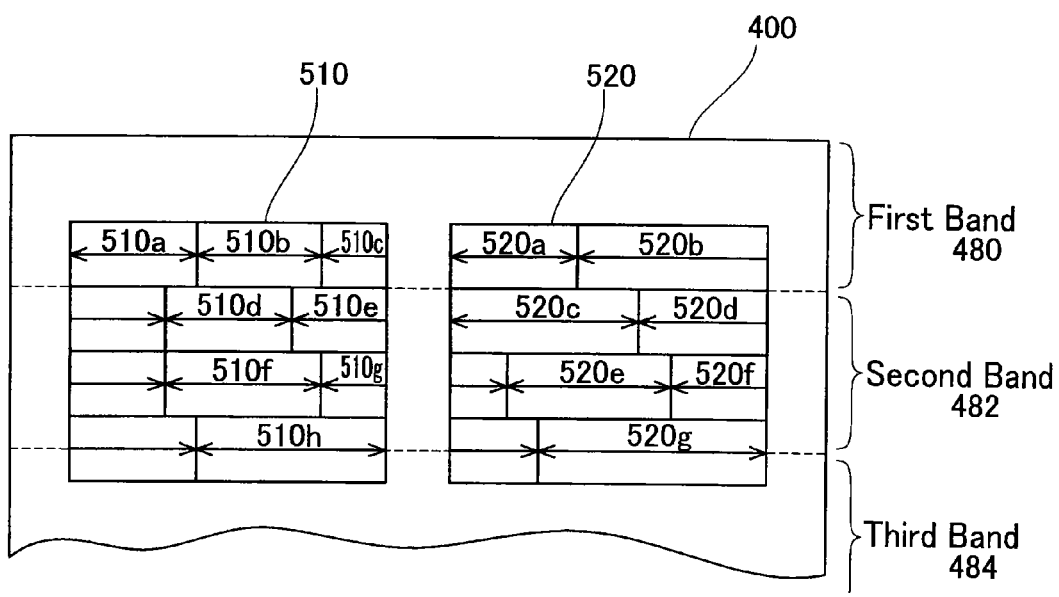
FIG. 15 illustrates an example of an HTTP response.
FIG. 16 is an explanatory diagram illustrating a state in which image objects are downloaded in small fractions.

FIG. 15 illustrates an example of HTTP responses. The HTTP response 710 includes a letter string 712 indicating which range of response data is being transmitted and a letter string 714 indicating a total data size of the JPEG file 600. The HTTP response 710 may include meta information (see a reference numeral 612 of FIG. 13) and compressed data (see a reference numeral 614 of FIG. 13). Data included in the HTTP response 710 differs in accordance with the contents of the HTTP request 700. For example, if a range from the head to 6000 bytes of the JPEG file 600 is meta information, and a HTTP request 700 commanding to transmit a response data of a range from the head to 3999 bytes is received, the HTTP response 710 will include only the meta information. Further, if a HTTP request 700 commanding to transmit response data of a range from 4000 bytes to 7999 bytes in response is received in the above example, the HTTP response 710 will include both the meta information and the compressed data. If the HTTP request 700 commanding to transmit response data of a range from 8000 bytes to 11999 bytes is received in the above example, the HTTP response 710 will include only the compressed data. It should be noted that FIG. 15 exemplifies compressed data 716 which is included in the HTTP response 710.

If the process at S54 shown in FIG. 6 is carried out, the multi-function device 40 in this case receives 4000 bytes of data (S56). The CPU 52 increases the index 78 of the CDM 72 (see FIG. 4). For example, if the multi-function device 40 receives data of the image object 510 (photo 001.jpg) covering a range from the head to 3999 bytes, the index 78 of context data corresponding to the image object 510 is increased up to "3999." It should be noted that when the meta information 612 (see FIG. 13) is received at S56, the CPU 52 stores the meta information 612 in the CDM 72. The CPU 52 thus can decompress compressed data in an oncoming process (S70 of FIG. 7) by utilizing the meta information 612 stored in the CDM 72.

Next, the CPU 52 determines whether or not all the meta information is received (S58). For example, the meta information 612 (see FIG. 13) includes data by which the data size of the entire meta information itself can be calculated. The CPU 52 can calculate the total data size of the meta information 612 and determine, by means of the index 78, whether or not a whole of the data size is received. If a negative judgment is made at S58, the CPU 52 returns to S54 so as to make the next HTTP request. This HTTP request includes the letter string 702 (see FIG. 14) which commands to transmit 4000 bytes of data (4000 to 7999) subsequent to a value (3999 in this case) stored in the index 78.

If an affirmative judgment is made at S58, it means that all the meta information 610 has been received. For example, if the meta information 612 of the JPEG file 610 has a volume of 6000 bytes, the meta information 612 covering a range from the head to 3999 bytes is received by the first execution of S56, and the meta information 612 covering a range from 4000 bytes to 6000 bytes (that is, all the meta information in total) are received in the next execution of process of S56. In this case, the compressed data 614 covering a range from 6001 bytes to 7999 bytes is simultaneously received. In this case, a process at S60 is carried out. At S60, the CPU 52 stores the compressed data in the CDM 72 (see FIG. 4). For example, if compressed data of the image object 510 "photo 001.jpg" is received, the CPU 52 stores the compressed data associated with the file name of the image object 510 in the CDM 72. The process of the CPU 52 advances to S70 of FIG. 7 after the completion of S60.

At S70, the CPU 52 creates decompressed data by decompressing the compressed data which has been stored in the CDM 72 at S60. The decompressed data is temporally stored in the DDM 86 (see FIG. 4). Further, the CPU 52 converts the decompressed data stored in the DDM 86 into binary data and writes the binary data into the BM 88 (see FIG. 4). The decompressed data is bit-mapped data of 256 gradations of RGB. The binary data is bit-mapped data which is binary encoded. The print device 46 (see FIG. 3) can put down dots on the printing medium 400 in accordance with the binary data in an oncoming process (S32 of FIG. 5). It should be noted that binary data may hereinafter be called as "print data". After creating the decompressed data and the binary data, the CPU 52 deletes the compressed data stored in the CDM 72 as well as the decompressed data stored in the DDM 86.

FIG. 16 is an explanatory diagram illustrating a state in which decompressed data of the two image objects 510 and 520 are created. By carrying out the aforementioned processes at S70, decompressed data (and binary data) corresponding to a part 510a of the image object 510 is created. With respect to the image object 510 to be processed, the CPU 52 determines whether or not all the decompressed data (that is, binary data) corresponding to the process band (that is, the first band 480 in this example) are created (S72). For example, at the stage of completing the creation of the decompressed data corresponding to the part 510a of FIG. 16, decompressed data of parts 510b and 510c included in the first band 480 are not created yet. In this case, the CPU 52 makes a negative judgment at S72.

When a negative judgment is made at S72, the CPU 52 transmits an HTTP request to the PC 10 (S74). The HTTP request includes the letter string 702 (see FIG. 14) which commands to transmit a range of data with a volume of 4000 bytes (which in this case is 8000 to 11999) subsequent to the value (7999 in this example) stored in the index 78. More specifically, the CPU 52 requests for compressed data subsequent to the compressed data received at S56 of FIG. 6. As its result, the multi-function device 40 receives 4000 bytes of compressed data (S76). Further, the CPU 52 increases the index 78 (see FIG. 4) of the CDM 72 and stores the compressed data in the CDM 72. Next, the CPU 52 determines whether or not all the compressed data constituting the image object 510 within the process band are received (S78). At S78, a negative judgment is made in a case where 4000 bytes of response data has been received as the result of the prior request for 4000 bytes of data. On the other hand, an affirmative judgment is made at S78 in a case where less than 4000 bytes of response data has been received as the result of the prior request for 4000 bytes. In this case, the CPU 52 changes the received flag 82 (see FIG. 4), which corresponds to the image object to be processed, from '0' to '1' (S80).

If a negative judgment is made at S78, the process of the CPU 52 returns to S70 so as to create decompressed data by decompressing compressed data and convert the decompressed data into binary data (print data). Due to the repetition of the processes, decompressed data of the part 510*b* of FIG. 16 is created, and binary data of the part 510*b* is written into the BM 88. In this state, a negative judgment is made again at S72. Thus, the CPU 52 repeats carrying out processes of S74, S76, and S70. Thus, decompressed data of the part 510*c* of FIG. 16 is created, and binary data of the part 510*c* is written into the BM 88. It should be noted that the part 510*c* also extends into the second band 482. In this case, the CPU 52 writes only the binary data of the part 510*c* included in the first band 480 into the BM 88. Further, in this case, the CPU 52 deletes from the CDM 72 only the compressed data which was required for creating the decompressed data corresponding to the first band 480 in the process at S70. More specifically, the compressed data having been received and is required for creating the decompressed data corresponding to the second band 482 remains in the CDM 72. The compressed data is used when the decompressed data corresponding to the second band 482 is created.

In a case where binary data corresponding to the parts 510*a*, 510*b*, and 510*c* of FIG. 16 are created, an affirmative judgment is made at S72. In this case, the process of the CPU 52 advances to S84 of FIG. 7. At S84, the CPU 52 determines whether compressed data of the image object 510 to be processed does not exist in the CDM 72, and whether or not the received flag 82 (see FIG. 4) is logic "1". The received flag 82 becomes logic "1" if an affirmative judgment is made at S78. More specifically, if all the compressed data of the image object 510 are received, the received flag, 82, which corresponds to the image object 510, becomes logic "1". At the stage of completing creation of binary data corresponding to the parts 510*a*, 510*b*, and 510*c* of FIG. 16, not all of the compressed data of the image object 510 are received. A negative judgment is thus made at S84. In this case, the CPU 52 skips S86 and advances to S30 of FIG. 5. On the other hand, if an affirmative judgment is made at S84, the CPU 52 deletes, from the CDM 72, the context data corresponding to the image object (for example, 510) to be processed (S86).

At S30 of FIG. 5, the CPU 52 determines whether or not any image object which has not been processed in the process band (e.g. the first band 480). More specifically, the CPU 52 determines whether or not there is any image object which is included in the first band 480 and whose binary data corresponding to the first band 480 has not yet been created. For example, when the process at S30 is carried out at the stage of completing creation of binary data (of reference numerals 510*a*, 510*b*, and 510*c* shown in FIG. 16) of the image object 510, no binary data of the image object 520 has been created. In this case, an affirmative judgment is made at S30 and the CPU 52 returns to S20. At S20, the image object 520 is specified as the image object to be processed. The CPU 52 carries out each process of FIG. 6 and FIG. 7 for the image object 520. As a result, decompressed data (and binary data) corresponding to the parts 520*a* and 520*b* shown in FIG. 16 is created. In this case, a negative judgment is made at S30 of FIG. 5, and the process of the CPU 52 advances to S32.

At S32, the CPU 52 carries out a printing process of the first band 480. The CPU 52 commands the print device 46 to print in accordance with the binary data (print data) stored in the BM 88 (see FIG. 4). The print device 46 thus makes prints of the first band 480. Next, the CPU 52 makes judgment for all the bands as to whether or not printing is completed (S34). For example, at the stage of completing printing of the first band 480, the second band 482 and the subsequent thereof are not printed yet. In this case, a negative judgment is made at S34. Then, the CPU 52 next specifies the second band 482 as the process band to be processed in the next cycle of processes (S36). Further, the CPU 52 clears the BM 88 (see FIG. 4). In other words, the group of binary data of the first band 480 is deleted.

Upon completion of S36, the CPU 52 carries out the series of processes from S18 and on to the second band 482. Accordingly, decompressed data (and binary data) of the latter part (corresponding to the second band 482) of the part 510*c* (whose former-part has been decompressed within the first band 480), as well as a part 510*d*, a part 510*e*, a part 510*f*, a part 510*g*, and a part 510*h* of FIG. 16 are created. Next, decompressed data (and binary data) of a part 520*c*, a part 520*d*, a part 520*e*, a part 520*f*, and a part 520*g* of FIG. 16 are created. Binary data of the second band 482 is thus completed and printing process of the second band 482 is carried out (S32 of FIG. 5). The CPU 52 carries out printing processes of the third band 484 and the subsequent bands likewise. Accordingly, the printing medium 400 of a single page on which the eight pieces of image objects 510, 520, and the like are printed can be obtained. If printing for all the bands is completed, the CPU 52 makes an affirmative judgment at S34 of FIG. 5. In this case, the CPU 52 disconnects from the PC 10 (S38), and the processes are terminated.

By the above processes, compressed data of the image object 510 is downloaded in small fractional units (with a volume of 4000 bytes per unit) and decompressed data (and binary data) is created. Every time the decompressed data is created, a judgment is made as to whether or not all the decompressed data of the image object 510 corresponding to the first band 480 are created. If an affirmative judgment is made in the process of the CPU 52, downloading of the image object 510 is stopped and downloading of the image object 520 is commenced. The decompressed data (corresponding to the parts 510*a* to 510*c*) required for creating binary data of the first band 480 is thus selectively created. In other words, not all of the decompressed data of the image object 510 corresponding to the second band 482 and the third band 484 are created at a time. Therefore, memory usage (usage of the DDM 86 in this embodiment) for storing decompressed data is controlled to be small. When compressed data of the plurality of image objects 510, 520, and the like are downloaded through single connection so as to create decompressed data, the decompressed data can be efficiently created without suppressing the memory capacity.

Now processes after a negative judgment is made at S15 of FIG. 5 are described. FIG. 17 illustrates a part of XHTML print data 800 that is different from the aforementioned XHTML print data 300. The XHTML print data 800, like the XHTML print data 300, includes data 815 which specifies a position of the image object. It should be noted that, unlike the XHTML print data 300, the XHTML print data 800 includes only the data 815 which specifies a position of a single image object. The data 815 includes blanks 820, 822, and 824, width 826, and height 828. These have similar meaning as the blanks 320, 322, and 324, the width 326, and the height 328 of FIG. 9. The XHTML print data 800 includes a class attribute 840. Further, the XHTML print data 800 includes data 850 which specifies a file name 852 and a class 854 of the image object. The file name 852 is "photo 001.jpg." The class 854 is "img__34__270deg." This means that a rotation angle of the image object included in the XHTML print data 800 is 270 degrees (in clockwise).

Figure 18:
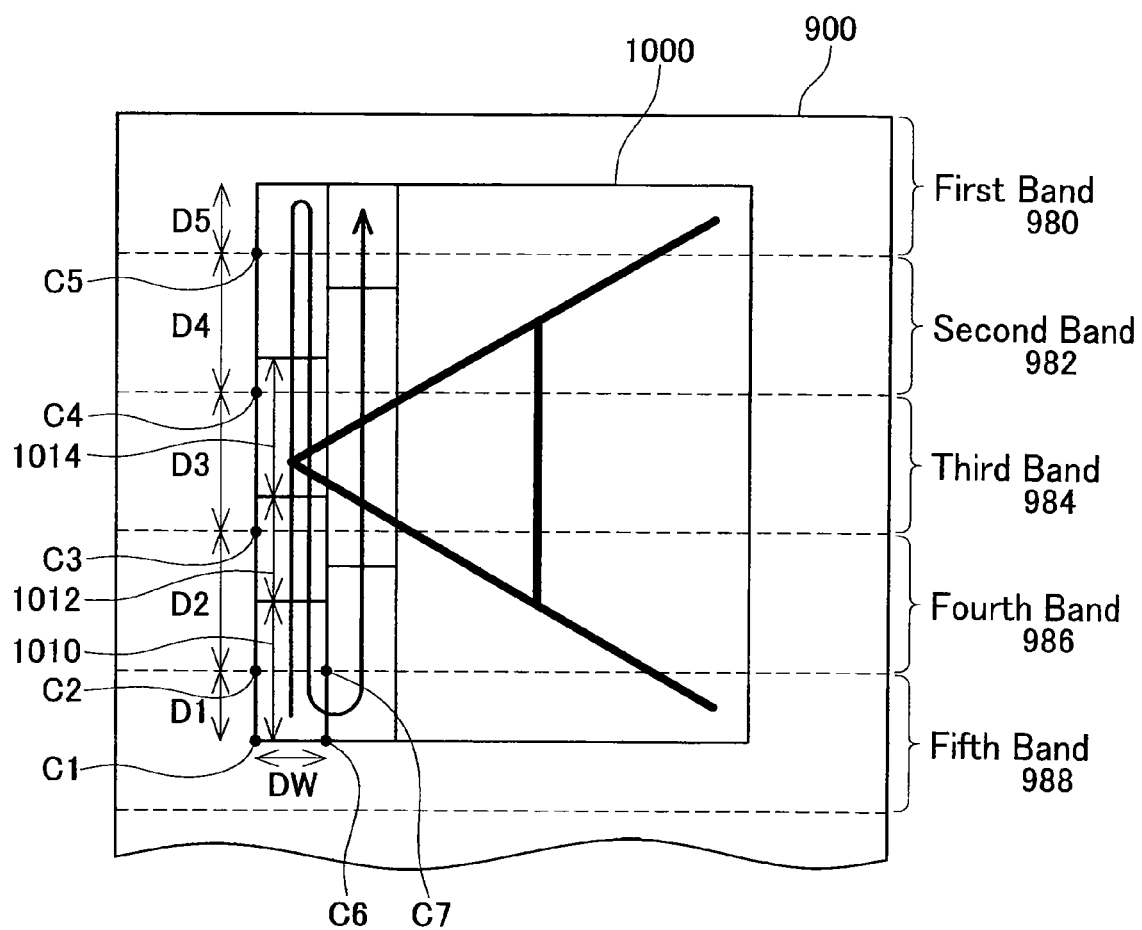
FIG. 18 briefly illustrates an image object which is included in the XHTML print data.

FIG. 18 is a pattern diagram illustrating an image object 1000 which is included in the XHTML print data 800. Binary data (print data) utilized in printing on a printing medium 900 is divided into a plurality of bands 980, 982, 984, 986, and 988. The image object 1000 includes a letter of the English alphabet "A." In an absolute data composition (a state stored in the PC 10) of the image object 1000, the letter "A" turns upward. More specifically, if an angle of rotation is zero at the time of printing the image object 1000, the letter "A" which is turned upward is printed. In the example of FIG. 18, the letter "A" is turned to left because the image object 1000 has 270 degrees of rotation angle in clockwise. The letter "A" which is turned to left is printed on the printing medium 900. Even in this case, compressed data is downloaded in order from the head first in accordance with the absolute data composition of the image object 1000. More specifically, in the example of FIG. 18, compressed data 1010 is downloaded first, then compressed data 1012 is downloaded, and then compressed data 1014 is downloaded.

As for the XHTML print data 800 described above, the CPU 52 makes a negative judgment at S15 of FIG. 5. In this case, the process of CPU 52 advances to S100 of FIG. 19. At S100, the CPU 52 clears the BM 88 of the contents stored therein. Next, the CPU 52 carries out a process for creating a table (S102). FIG. 20 illustrates a flowchart of the table creating process. The CPU 52 specifies an image object to be processed (S130). As for the XHTML print data 800 described above, the CPU 52 specifies the image object 1000. The CPU 52 then creates context data (see FIG. 4) of the image object 1000 (S132). This process is the same as the process at S52 of FIG. 6. Subsequently, the CPU 52 transmits a request the PC 10 for transmitting 4000 bytes of response data of the image object 1000 to be processed (S134). This process is the same as the process at S54 of FIG. 6. As the result of the aforementioned process, the multi-function device 40 receives the data for 4000 bytes (S136). Further in S136, the CPU 52 increases the index 78 of the CDM 72 (see FIG. 4). This process is the same as the process at S56 of FIG. 6. The CPU 52 determines whether or not all the meta information is received (S138). This process is the same as the process at S58 of FIG. 6.

Figure 22:
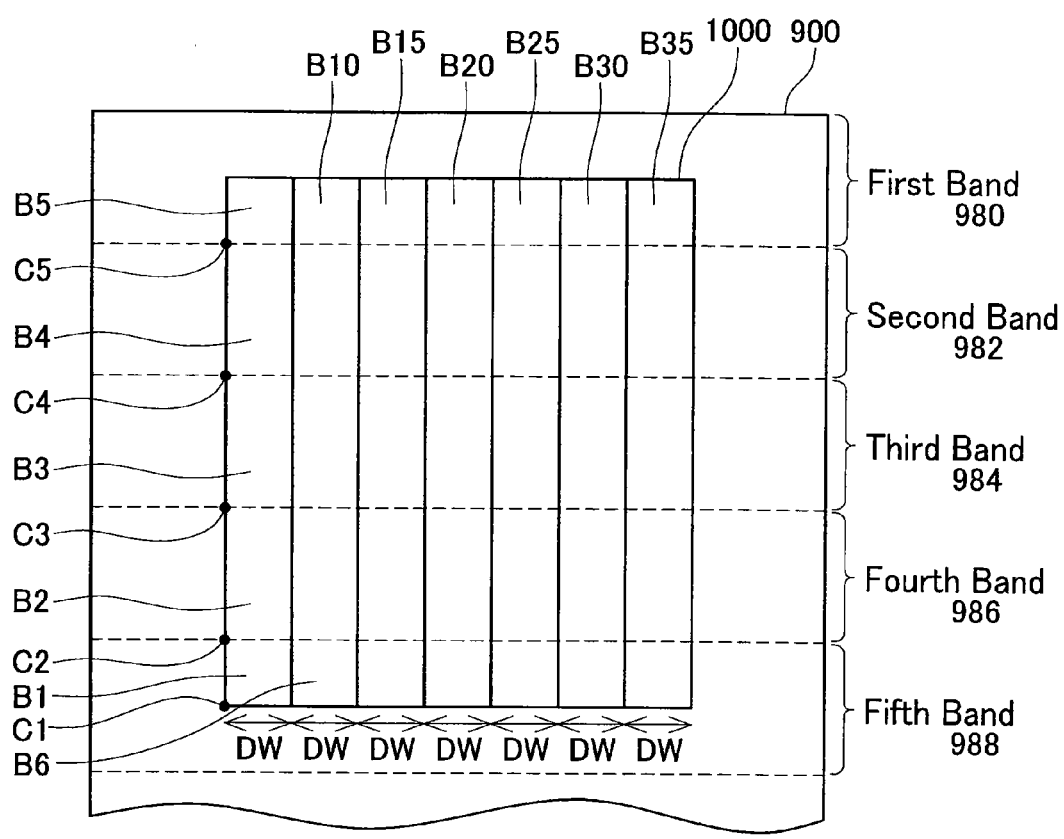
FIG. 22 is a diagram for explaining blocks.

If an affirmative judgment is made at S138, the CPU 52 carries out a process for creating a block (S140). Referring to FIG. 18 and FIG. 22, a description of blocks will be given below. As shown in FIG. 18, the image object 1000 extends into a plurality of bands 980 through 988. As described above, the compressed data 1010, 1012, and 1014 are downloaded in sequence. Decompressed data (also binary data) to be created from each of the compressed data 1010, 1012, and 1014 has a fixed width DW. It should be noted that in this embodiment, the DW is the lateral width as it looks in FIG. 18, but in the case of the absolute data composition (that is, when a rotation angle is zero) of the image object 1000, the DW is the longitudinal width. The lateral width DW may be a standard value or value which varies among objects. FIG. 22 briefly illustrates the image object 1000. In this embodiment, areas which are partitioned by the borders of the bands 980 to 988 and the lateral widths DW are called "blocks." More specifically, as for the image object 1000 according to this embodiment, there are 35 pieces of blocks B1 to B35. Furthermore, not all of the blocks are accompanied with reference numeral. In the example of FIG. 22, the first band 980 includes seven blocks (B5, B10, B15, B20, B25, B30, and B35).

At S140 of FIG. 20, the CPU 52 writes information which specifies each block into the table 84 (see FIG. 4). FIG. 23 illustrates an example of the table 84. In the table 84, information 1100 specifying blocks, coordinates 1102, width 1104, a band 1106, and a data range 1108 are associated to each other. The CPU 52 writes each of the blocks B1 to B35 into the column of the information 1100. Further, the CPU 52 writes coordinates corresponding to each of the blocks B1 to B35 to the coordinates column 1102. The coordinates are coordinates C1 to C7 and the like of the vertex at the lower left of each block B1 to B35 in FIG. 18 and FIG. 22. More specifically, in regards to the absolute data composition (that is, if a rotation angle is zero) of the image object 1000, the coordinates C1 to C7 and the like are coordinates of the vertex at the upper left of each of the blocks B1 to B35.

The CPU 52 writes the width 1104 corresponding to each of the blocks B1 to B35 into the table 84. The width is the longitudinal width of each block in FIG. 18. For example, D1 of FIG. 18 is written as the width 1104 corresponding to the block B1. Similarly, D2, D3, D4 and D5 are written correspondingly to the block B2, B3, B4, and B5, respectively. It should be noted that D2, D3, and D4 have the same values because they coincide with the band width. Further, the CPU 52 writes the band 1106 corresponding to each of the blocks B1 to B35 into the table 84. For example, a number "5" which represents the fifth band 988 is written as the band 1106 corresponding to the blocks B1. Similarly, numbers "4","3", "2" and "1" are written correspondingly to the block B2, B3, B4 and B5, respectively. After S140 of FIG. 20 is carried out, the table 84 is under a state in which data is written into each of the columns 1100, 1102, 1104, and 1106. However, nothing is written in a column of data range 1108.

After S140 of FIG. 20 is carried out, the CPU 52 stores compressed data in the CDM 72 (S142). This process is the same as the process at S60 of FIG. 6. Next, the CPU 52 creates decompressed data by decompressing the compressed data stored in the CDM 72 at S142 (S144). The CPU 52 stores the decompressed data in the DDM 86 (see FIG. 4). The CPU 52 specifies to which band the decompressed data corresponds (more specifically, to which block the decompressed data corresponds). In other words, the CPU 52 specifies for which band's (block's) binary data creation the decompressed data is necessary. As the coordinates of each of the blocks B1 to B 35 are clarified (see FIG. 23), the CPU 52 can specify to which block the decompressed data corresponds. A data range of the compressed data which is the origin of the decompressed data can be specified from the data range (see the reference numeral 702 of FIG. 14) which has been requested at S134. An association of a band (block) and a data range of the compressed data required for creating print data of the band (block) is thereby specified. The CPU 52 writes information into the data range 1108 corresponding to the specified block of the table 84 shown in FIG. 23. The process of the CPU 52 advances to S150 of FIG. 21 after completing the process at S144.

At S150, the CPU 52 determines whether or not decompressed data corresponding to the first band 980 (see FIG. 18) exist in the decompressed data created at S144. In other words, the CPU 52 determines whether or not decompressed data required for creating print data of the first band 980 is included in the decompressed data created at S144. If an affirmative judgment is made here, the CPU 52 carries out a process for converting decompressed data corresponding to the first band 980 into binary data (print data) (at S152). The CPU 52 stores the print data in the BM 88 (see FIG. 4). On the other hand, if a negative judgment is made at S150, the CPU 52 skips the process of S152.

The CPU 52 deletes the compressed data stored in the CDM 72 and the decompressed data stored in the DDM 86 (S154). Next, the CPU 52 determines whether or not the received flag 82 (see FIG. 4) of the image object to be processed is logic "1" (S156). If a negative judgment is made here, the CPU 52 transmits an HTTP request to the PC 10 (S158). The HTTP request includes the letter string 702 (see FIG. 14) which commands to transmit 4000 bytes of data subsequent to the value stored in the index 78 (see FIG. 4). This process is carried out as in the process at S74 of FIG. 7.

The CPU 52 increases the index 78 (see FIG. 4) of the CDM 72 and stores the compressed data in the CDM 72 (S160). This process is carried out as in the process at S76 of FIG. 7. Next, the CPU 52 determines whether or not all the compressed data which constitute the image object to be processed have been received (S162). This process is carried out as in the process at S78 of FIG. 7. If an affirmative judgment is made here, the CPU 52 changes the logic of the received flag 82 (see FIG. 4) corresponding to the image object to be processed from "0" to "1" (S164). On the other hand, when a negative judgment is made at S162, S164 is skipped.

When a negative judgment is made at S162 or the process at S164 is completed, the CPU 52 advances to S144 of FIG. 20. The compressed data received at S160 is in consequence decompressed, a block is specified based on the decompressed data, and the information is written into the table 84. The CPU 52 creates the table 84 by repeating downloading the compressed data, decompressing the compressed data, specifying blocks, and writing into the table 84. If the aforementioned processes for all the compressed data of the image object to be processed are carried out, an affirmative judgment is made at S156 of FIG. 21. In this case, the CPU 52 determines, based on the XHTML print data 800, whether or not any other image object exists (S166). In the case of the XHTML print data 800, only the single image object 1000 exists, and accordingly a negative judgment is made at S166. In this case, the process for creating a table is completed. On the other hand, if another image object exists, the CPU 52 specifies one of the image objects as an image object to be processed (S130) and carries out the processes for the image object at S132 and the subsequent Steps.

Figure 19:
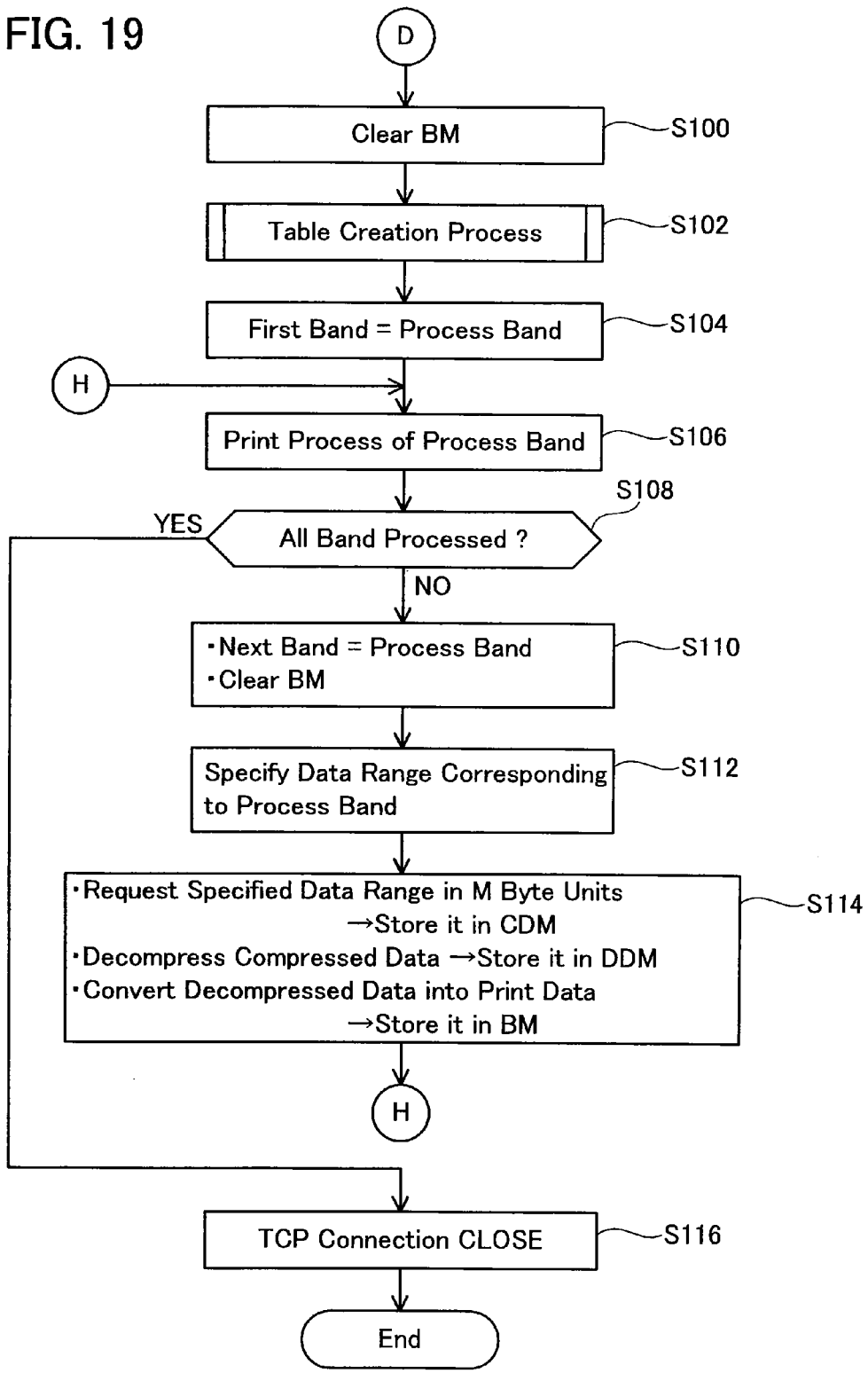
FIG. 19 illustrates a flowchart which forms a sequel to that of FIG. 5.
Figure 20:
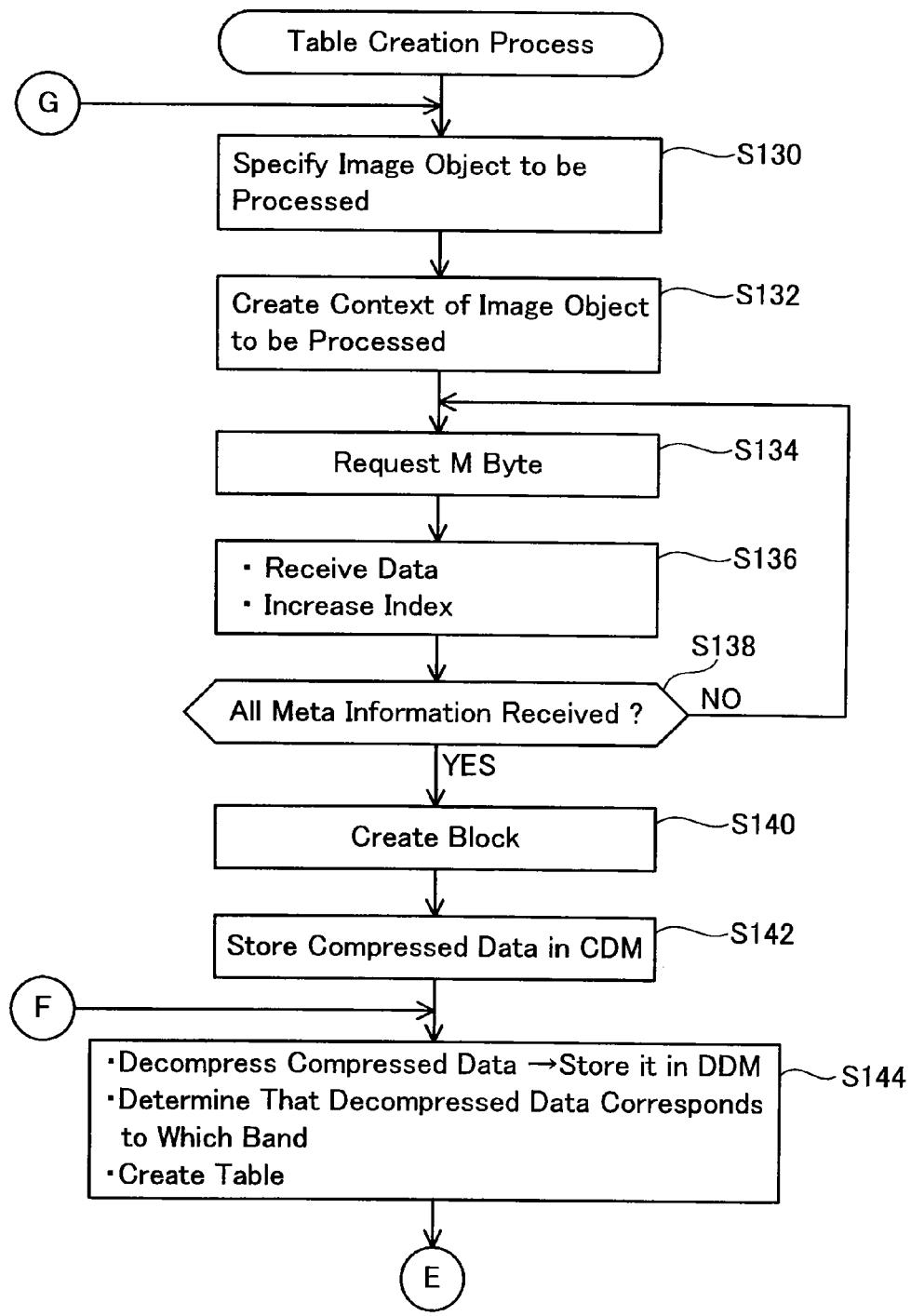
FIG. 20 illustrates a flowchart of table creating process.

Upon completion of creation of the table 84 at S102 of FIG. 19, the process of the CPU 52 advances to S104. At S104, the CPU 52 specifies the first band 980 as a band to be processed. As described above, print data of the first band 980 has been already created by the table creating process (see S152 of FIG. 21). The CPU 52 carries out a process for printing the print data of the first band 980 stored in the BM 88 (see FIG. 4) (S106). This process is carried out as in S32 of FIG. 5. Next, the CPU 52 determines whether or not all the bands have been printed (S108). For example, at the stage of completion of printing of the first band 980, printing on and after the second band 982 is not carried out yet. In this case, a negative judgment is made at S108.

If a negative judgment is made at S108, the CPU 52 specifies the next band (for example, the second band 982) as a band to be processed and then deletes the BM 88 (see FIG. 4) (S110). Next, the CPU 52 specifies, by scanning the table 84, a data range corresponding to a band to be processed (S112). For example, if the second band 982 is the process band, the CPU specifies data ranges from R7 to R8 (see FIG. 23) corresponding to the block B4. It should be noted that a block B7 and the subsequent blocks are omitted in FIG. 23. The CPU 52 also specifies other data ranges which are on and after the block B7 and correspond to the second band 982. Thus, all the data corresponding to the second band 982 are specified.

The CPU 52 requests the PC 10 to transmit compressed data within a data range specified at S112 in units of 4000 bytes (S114). In this embodiment, the data size to be requested at S114 is the same as the data size to be requested at S134 of FIG. 20 and at S158 of FIG. 21; however, different size of data may be requested. For example, all the compressed data of a single block may be requested. The CPU 52 stores compressed data in the CDM 72 (see FIG. 4). Next, the CPU 52 creates decompressed data by decompressing the compressed data. The CPU 52 stores the decompressed data in the DDM 86 (see FIG. 4). Then, the CPU 52 creates print data by converting the decompressed data. The CPU 52 stores the print data in the BM 88 (see FIG. 4). The CPU 52 then deletes the compressed data stored in the CDM 72 and the decompressed data stored in the DDM 86. The CPU 52 carries out the processes of S114 by repetitively carrying out request for compressed data, decompressing the compressed data, converting the decompressed data, and deleting the data (specifically, the compressed data and the decompressed data). Thus, print data of the band to be processed (for example, the second band 982) is created.

The print data created at S114 is printed at S106. If all the bands are printed, the CPU 52 makes an affirmative judgment at S108. In this case, the connection to the PC 10 is cut by the CPU 52 (S116) and the process is terminated. This process is carried out as in S38 of FIG. 5.

In the technique according to this embodiment, an association (table 84) of a band and a data range of the compressed data required for creating print data of the band is derived. In creating print data of each band, it is possible to decompress only the compressed data required for creating the band. For example, when print data of the second band 982 of FIG. 18 is to be created, only the compressed data required for creating the second band 982 can be decompressed. Further, when print data of the third band 984 is to be created, only the compressed data required for creating the third band 984 can be decompressed. It is not required to decompress all the compressed data (or almost all the compressed data) of the image object 1000 in each and every occasion of creating print data of each band. Furthermore, memory usage can be controlled to be lessened by the employment of the technique, which replaces the method by caching all the decompressed data which is created from the compressed data of the image object 1000. In other words, the technique disclosed herein facilitates advantageous print data creation.

A part of technique disclosed in the above embodiment will be described below. As described above, the decompressed data creation device may carry out decompression of compressed data in partial units after all the compressed data of the image object(s) are obtained by the obtaining device. On the other hand, the obtaining device may repeat obtaining a predetermined size of compressed data. It should be noted that "a predetermined size" does not have to be a definite size. For example, the obtaining device may obtain 1000 bytes of compressed data at a certain timing and obtain 900 bytes of compressed data at another timing. The decompressed data creation device may repeat creating decompressed data by decompressing the aforementioned predetermined size of compressed data. The band determination device may repeat determining to which band the decompressed data created from the aforementioned predetermined size of compressed data is necessary. The deletion device may repeat deleting the decompressed data which is created from the aforementioned predetermined size of compressed data.

The deletion device may repeat deleting decompressed data created from the aforementioned predetermined size of compressed data and the compressed data. With such a composition, the memory usage can be efficiently controlled because both the decompressed data and the compressed data are deleted.

In a case where both the decompressed data and the compressed data are deleted, the following composition may be adopted. More specifically, the print data creation apparatus may be additionally provided with a re-obtaining device which re-obtains compressed data within the data range specified by the data specifying device from an external source. In this case, the print data creation device may create decompressed data by decompressing the compressed data re-obtained by the re-obtaining device and convert the decompressed data into print data.

The print data creation apparatus described above may be additionally provided with a decompressed data storage device and a print data storage device. The decompressed data storage device may store decompressed data created by the decompressed data creation device. The deletion device may delete, from the decompressed data storage device, the decompressed data corresponding to a band which has been determined by the band determination device. The print data storage device may store the print data created by the print data creation device.

This technique requires decompression of all the compressed data so as to establish the association of a band and a data range of compressed data. It is possible to have the print data storage device store print data of a first band (band to be created first of all) after creating the print data from the decompressed data. In this case, it is not required to create the print data from the compressed data corresponding to the first band after establishing the association of a band and a data range of compressed data. In order to materialize such configuration, the print data creation apparatus may be additionally provided with a storage control device that creates print data by converting the decompressed data which is determined as being necessary to create the print data corresponding to the first band, and stores the print data in the print data storage device. This composition may facilitate efficient print data creation. In the composition, it is not always necessary for the data range storage device to store (of course, may store) the association of a first band and a data range of compressed data necessary for creating the first band.

The print data creation apparatus may be additionally provided with a rotation angle specifying device that specifies a rotation angle of the aforementioned one or more image objects. The data range storage device may store the association (relation of a band and a data range of compressed data) of each band if the rotation angle specified by the rotation angle specifying device is not zero. Further, it is not necessary for the data range storage device to store the association (relation of a band and a data range of compressed data) of each band if the rotation angle specified by the rotation angle specifying device is zero. In the composition, if a rotation angle is zero, information to be stored in the data range storage device is not created. Furthermore, information to be stored in the data range storage device may be created regardless of rotation angle. That is, if a rotation angle is zero, information to be stored in the data range storage device may be created.

The techniques disclosed in this specification can be also expressed as a print data creation method for creating print data in band units. Further, the techniques disclosed in this specification can be also expressed as a computer program (or computer readable medium in which computer programs are stored) for creating print data in band units.

The print data creation apparatus may download compressed data of image object(s) from an external source utilizing a single connection. Further, the compressed data of the image object(s) may be downloaded in parallel utilizing multiple connections.

A layout process to determine a relative position of an image object and respective band may be carried out. The layout process may be carried out based on the position data of each image object included in the XHTML print data.

Print data of each band may be created in accordance with the order of which the print data are printed on a print medium. The width of a single band may be set, for example, based on a range which can be printed by a single scan of an ink jet head.

The print data may be binary data. The print data may be another type of data (for example, multi-valued data).

Decompressed data may be, for example, bit-mapped data which can be expressed by a multi-hierarchy (for example, 256 hierarchies (gradations)) of RGB. Print data may be bit map data which can be expressed by a hierarchy smaller than that of decompressed data. The number of hierarchies of print data depends on the actual composition of a printer. For example, in the case of a printer which prints out by simply utilizing information concerning to dot-on and dot-off, print data may be expressed by 2 hierarchies (for example, 0 and 1). On the other hand, in the case of a printer which prints out utilizing information concerning to a large dot, medium dot, small dot, and dot-off, print data may be expressed by 4 hierarchies (for example, 0, 1, 2, and 3).

The embodiment described above merely illustrates one of the possibilities. The technique disclosed in the embodiment may include various transformations and modifications, and some of which are listed in the followings:

(1) For example, the multi-function device 40 according to the embodiment downloads compressed data of the image object from the PC 10 and creates print data. However, the multi-function device 40 can otherwise create print data by downloading an image object from a digital camera, a memory card, a server on the Internet, and other external devices.

Figure 21:
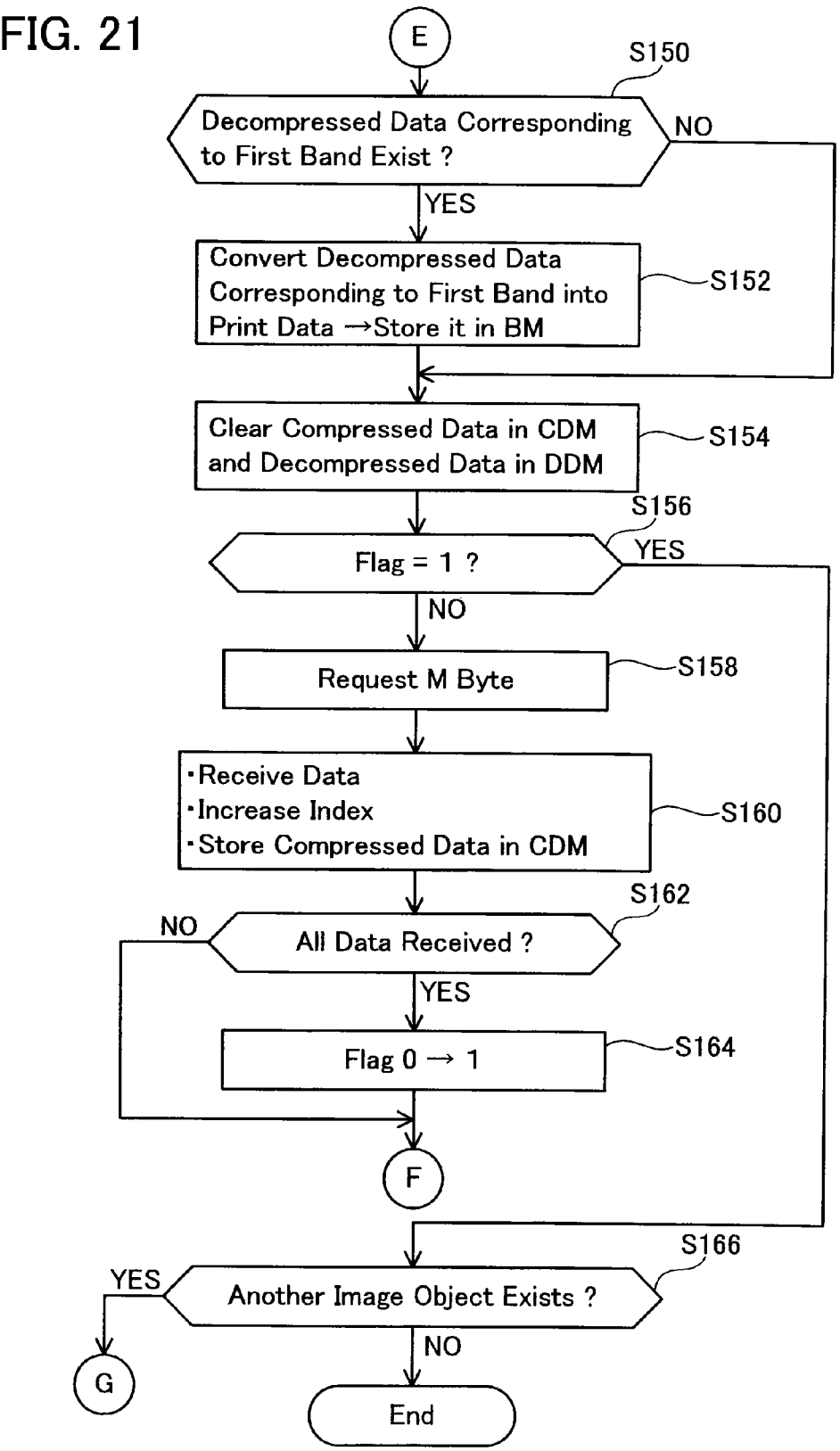
FIG. 21 illustrates a flowchart which forms a sequel to that of FIG. 20.

(2) Data size can be changed among the respective request at S54 of FIG. 6, at S74 of FIG. 7, at S134 of FIG. 20, and at S158 of FIG. 21.

(3) It is not necessary to create a table corresponding to the first band 980 in the table creating process. Print data of the first band 980 is created in the table creating process, and thereby it is not required to create the print data of the first band 980 in the processes to be carried out at S112 and S114 of FIG. 19.

(4) In the embodiment described above, the XHTML print data to be transmitted from the PC 10 includes information concerning a rotation angle of image object. The rotation angle can be specified by a user via the PC 10 as well as the multi-function device 40.

What is claimed is:

1. A print data creation apparatus for creating print data in band units, the print data creation apparatus comprising:
a processing unit; and
memory storing computer-readable instructions that, when executed by the processing unit, cause the print data creation apparatus to perform operations comprising:
sequentially obtaining, from an external apparatus, each of a plurality of partial compressed data included in particular compressed data which is compressed data of one or more image objects;
sequentially decompressing compressed data so as to create each of a plurality of partial decompressed data;
deleting, each time one partial decompressed data is created from one partial compressed data, the one partial compressed data
determining, each time the one partial decompressed data is created, forte which band the one partial decompressed data is necessary;
deleting, each time a band has been determined for one partial decompressed data, the one partial decompressed data;

storing, each time a band has been determined for one partial decompressed data, an association of the band and a data range of one partial compressed data that is original of the one partial decompressed data in a specific memory area;

specifying from the specific memory area, after the association for each of the plurality of partial decompressed data has been stored in the specific memory area, a target data range associated with a target band of which print data is to be created;

re-obtaining, from the external apparatus, target compressed data of the particular compressed data, target compressed data having the specified target data range; and decompressing the target compressed data so as to create target decompressed data, and converting the target decompressed data so as to create print data of the target band.

2. The print data creation apparatus as in claim 1, wherein each of the plurality of partial compressed data has a predetermined data size.

3. The print data creation apparatus as in claim 1, wherein the memory stores computer-readable instructions that, when executed by the processing unit, cause the print data creation apparatus to further perform operations comprising:

sequentially storing each of the plurality of partial decompressed data in a decompressed data memory area; and storing the print data of the target band in a print data memory area, wherein deleting, each time a band has been determined for one partial decompressed data, deletes, the one partial decompressed data from the decompressed data memory area.

4. The print data creation apparatus as in claim 3, wherein the memory stores computer-readable instructions that, when executed by the processing unit, cause the print data creation apparatus to further perform operations comprising:

converting each partial decompressed data for which a first band has been determined so as to create print data of the first band, and storing the print data of the first band in the print data memory area, wherein in a case where the target band is the first band, not performing the operations of specifying and re-obtaining: and in a case where the target band is a band subsequent to the first band, performing the operations of specifying and re-obtaining.

5. The print data creation apparatus as in claim 1, wherein the memory stores computer-readable instructions that, when executed by the processing unit, cause the print data creation apparatus to further perform operations comprising:

specifying a rotation angle of the one or more image objects, wherein, in a case where the specified rotation angle is not zero, storing the association in the specific memory area, and in a case where the specified rotation angle is zero, not storing the association in the specific memory area.

6. A method of creating print data in band units, the method comprising:

sequentially obtaining, from an external apparatus, each of a plurality of partial compressed data included in particular compressed data which is compressed data of one or more image objects;

sequentially decompressing compressed data so as to create each of a plurality of partial decompressed data;

deleting, each time one partial decompressed data is created from one partial compressed data, the one partial compressed data determining, each time the one partial decompressed data is created, for which band the one partial decompressed data is necessary;

deleting, each time a band has been determined for one partial decompressed data, the one partial decompressed data;

storing, each time a band has been determined for one partial decompressed data, an association of the band and a data range of one partial compressed data that is original of the one partial decompressed data in a specific memory area;

specifying from the specific memory area, after the association for each of the plurality of partial decompressed data has been stored in the specific memory area, a target data range associated with a target band of which print data is to be created;

re-obtaining, from the external apparatus, target compressed data of the particular compressed data, target compressed data having the specified target data range; and decompressing the target compressed data so as to create target decompressed data, and converting the target decompressed data so as to create print data of the target band.

7. A non-transitory computer readable medium storing a computer program for creating print data in band units, the computer program including instructions for ordering a computer to perform:

sequentially obtaining, from an external apparatus, each of a plurality of partial compressed data included in particular compressed data which is compressed data of one or more image objects;

sequentially decompressing compressed data so as to create each of a plurality of partial decompressed data;

deleting, each time one partial decompressed data is created from one partial compressed data, the one partial compressed data;

determining, each time the one partial decompressed data is created, for which band the one partial decompressed data is necessary;

deleting, each time a band has been determined for one partial decompressed data, the one partial decompressed data;

storing, each time a band has been determined for one partial decompressed data, an association of the band and a data range of one partial compressed data that is original of the one partial decompressed data in a specific memory area;

specifying from the specific memory area, after the association for each of the plurality of partial decompressed data has been stored in the specific memory area, a target data range associated with a target band of which print data is to be created;

re-obtaining, from the external apparatus, target compressed data of the particular compressed data, target compressed data having the specified target data range; and decompressing the target compressed data so as to create target decompressed data, and converting the target decompressed data so as to create print data of the target band.

* * * * *